United States Patent [19]

Tsuga et al.

[11] Patent Number: 5,999,696
[45] Date of Patent: *Dec. 7, 1999

[54] OPTICAL DISC AND REPRODUCTION DEVICE WHICH CAN ACHIEVE A DYNAMIC SWITCHING OF THE REPRODUCED CONTENT

[75] Inventors: Kazuhiro Tsuga, Takarazuka; Masayuki Kozuka, Neyagawa; Kaoru Murase, Ikoma-gun; Kazuhiko Yamauchi, Neyagawa; Yoshihisa Fukushima; Katsuhiko Miwa, both of Osaka, all of Japan

[73] Assignee: Matsushita Electric Industrial Co., Ltd., Japan

[ * ] Notice: This patent is subject to a terminal disclaimer.

[21] Appl. No.: 09/296,686

[22] Filed: Apr. 20, 1999

Related U.S. Application Data

[62] Division of application No. 08/700,116, Aug. 20, 1996, Pat. No. 5,895,124.

[30] Foreign Application Priority Data

Aug. 21, 1995 [JP] Japan .................................... 7-212171

[51] Int. Cl.[6] ....................................................... H04N 5/91
[52] U.S. Cl. ............................. 386/98; 386/126; 386/125
[58] Field of Search .................................. 386/70, 90, 95, 386/98–99, 97, 108, 126, 125, 106, 46; 348/423, 6, 7, 8; H04N 5/91

[56] References Cited

U.S. PATENT DOCUMENTS

| | | |
|---|---|---|
| 4,953,035 | 8/1990 | Yoshio . |
| 5,043,826 | 8/1991 | Yoshio . |
| 5,065,252 | 11/1991 | Yoshio et al. . |
| 5,097,349 | 3/1992 | Nomura et al. . |
| 5,291,462 | 3/1994 | Richards . |
| 5,379,276 | 1/1995 | Igami et al. . |
| 5,537,387 | 7/1996 | Ando et al. . |
| 5,546,368 | 8/1996 | Lee et al. . |
| 5,596,564 | 1/1997 | Fukushima et al. . |
| 5,598,276 | 1/1997 | Cookson et al. . |
| 5,732,185 | 3/1998 | Hirayama et al. . |
| 5,778,142 | 7/1998 | Taira et al. . |
| 5,819,004 | 10/1998 | Azadegan et al. . |

FOREIGN PATENT DOCUMENTS

| | | |
|---|---|---|
| 424903 | 5/1991 | European Pat. Off. . |
| 521487 | 1/1993 | European Pat. Off. . |

(List continued on next page.)

OTHER PUBLICATIONS

"Density—Reinventing the Disc," by D. Parker, CD–ROM Professional, Jun. 1995.

*Primary Examiner*—Wendy Garber
*Assistant Examiner*—Vincent F. Boccio
*Attorney, Agent, or Firm*—Price, Gess & Ubell

[57] ABSTRACT

A multimedia optical disc which includes a data region for storing a plurality of objects which include video data, audio data and sub-picture data, wherein the data region is composed of a plurality of small regions, wherein each object is stored in consecutive small regions and wherein each small region includes a first subregion for storing video data of a certain reproduction period, a plurality of second subregions which each store audio data, wherein audio data stored in different second subregions express different reproduction audio to each other and each set of audio data is data to be reproduced at a same time as the video data in a first subregion, a plurality of third subregions which each store sub-picture data, wherein sub-picture data stored in different third subregions express different images to each other and each set of sub-picture data is data to be reproduced at a same time as the video data in the first subregion and a fourth subregion for storing control information, wherein each set of control information is valid for a reproduction period of data in a same small region and wherein the control information includes an indication to a reproduction device for a combination of one set of audio data out of the second subregions and one set of sub-picture data out of the third subregions which are to be reproduced together with the video data in the first subregion.

5 Claims, 25 Drawing Sheets

FOREIGN PATENT DOCUMENTS

| | | |
|---|---|---|
| 677843 | 10/1995 | European Pat. Off. . |
| 677848 | 10/1995 | European Pat. Off. . |
| 737979 | 10/1996 | European Pat. Off. . |
| 737980 | 10/1996 | European Pat. Off. . |
| 738999 | 10/1996 | European Pat. Off. . |
| 750304 | 12/1996 | European Pat. Off. . |
| 788105 | 8/1997 | European Pat. Off. . |
| 3141090 | 6/1991 | Japan . |
| 413287 | 1/1992 | Japan . |
| 4219627 | 8/1992 | Japan . |
| 6309841 | 4/1994 | Japan . |
| 7334939 | 12/1995 | Japan . |
| 628648 | 8/1996 | Japan . |
| 9414159 | 6/1994 | WIPO . |
| 9512180 | 5/1995 | WIPO . |
| 9512274 | 5/1995 | WIPO . |
| 9512276 | 5/1995 | WIPO . |

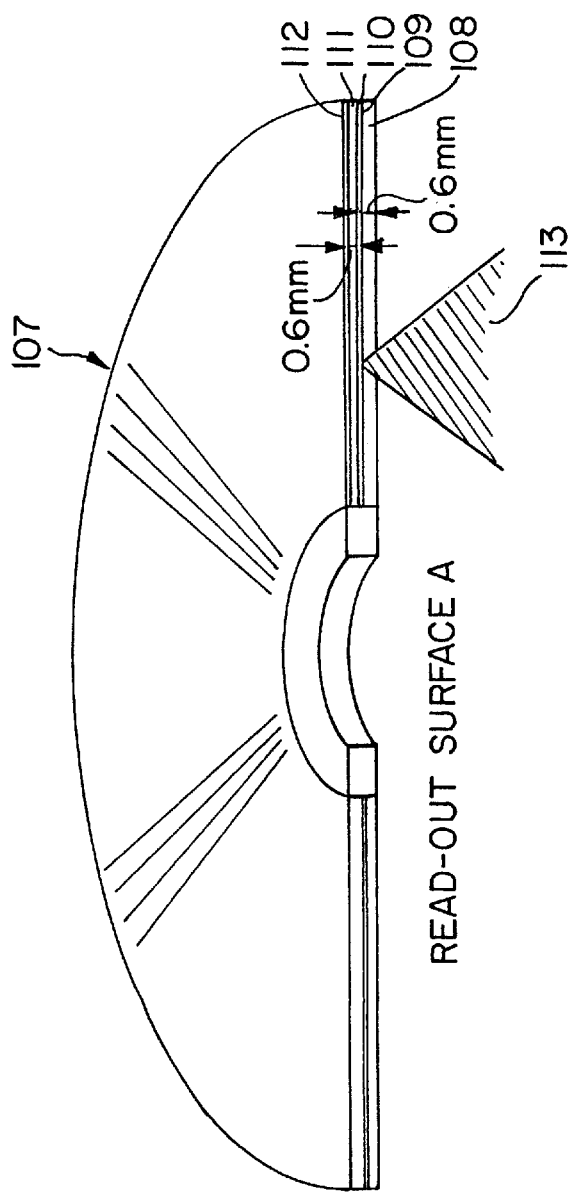
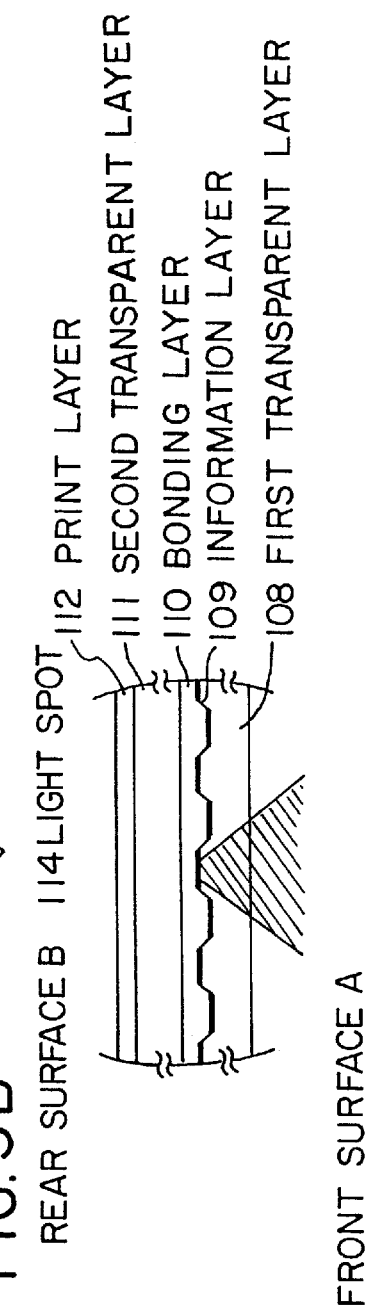

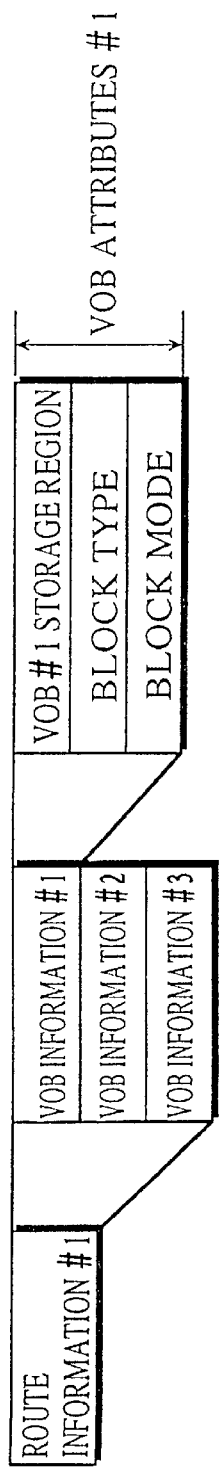

MULTIANGLE SYSTEM STREAM

MULTIANGLE PERIOD

JUMP ADDRESSES WHEN CHANGING ANGLE

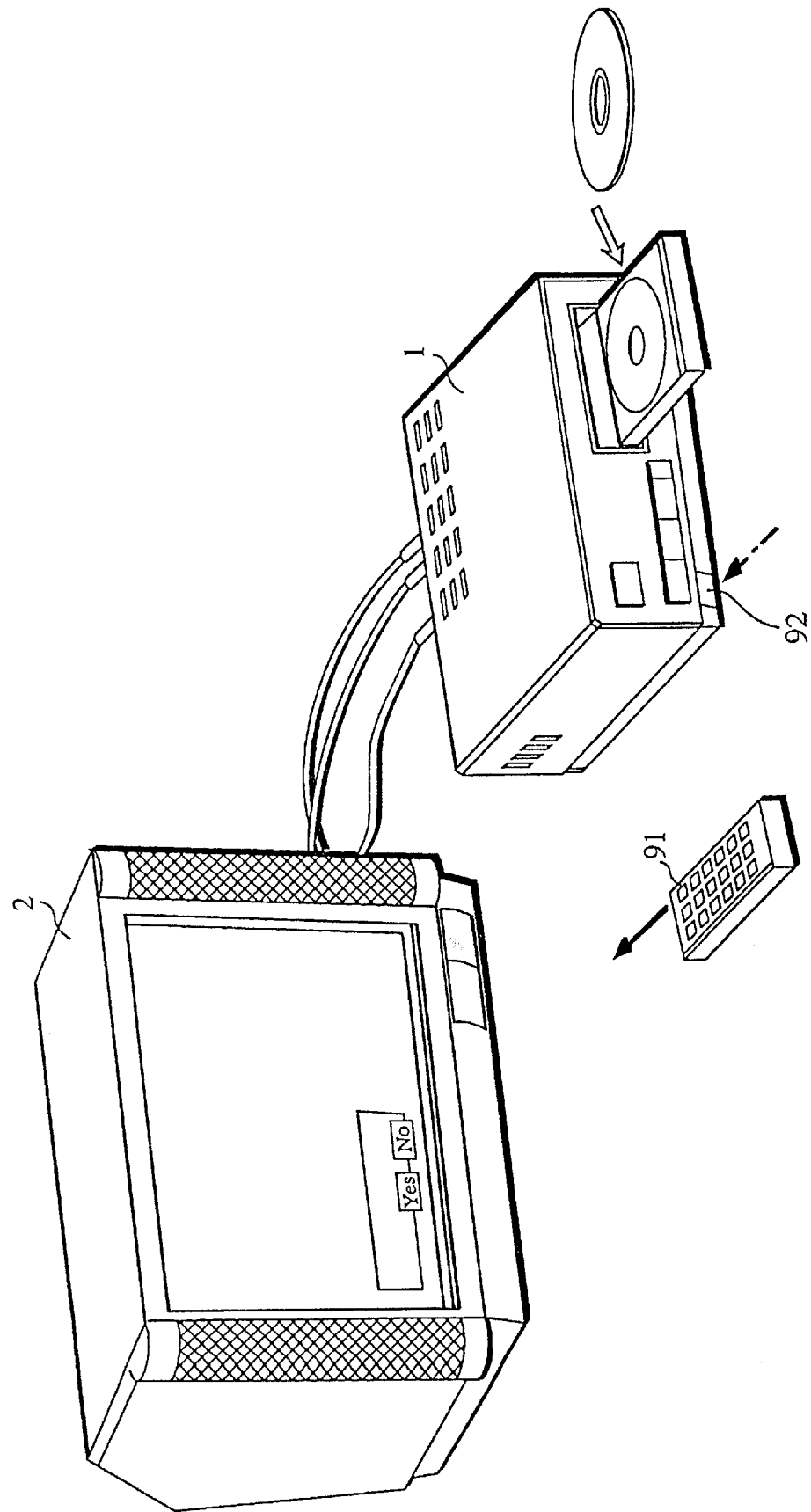

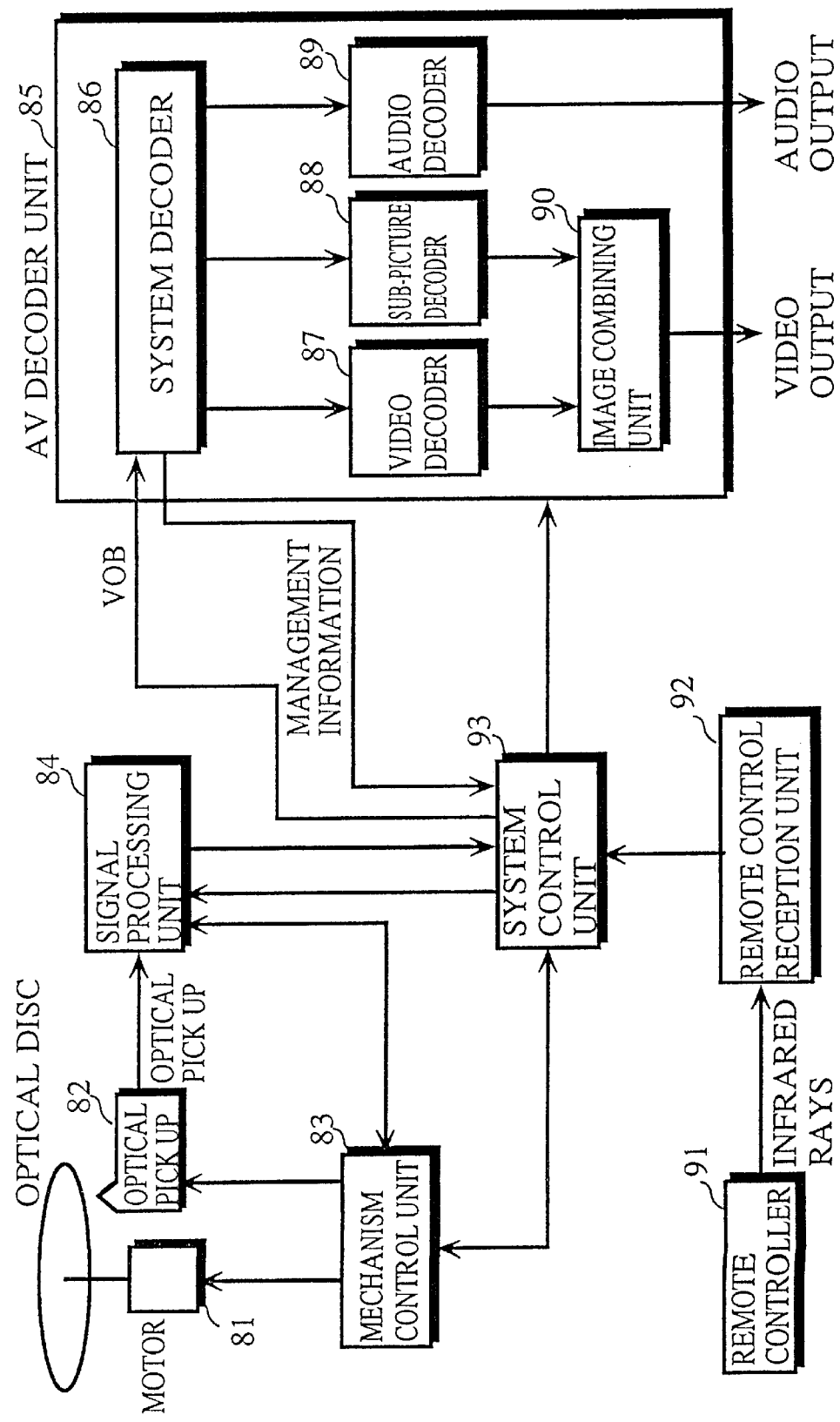

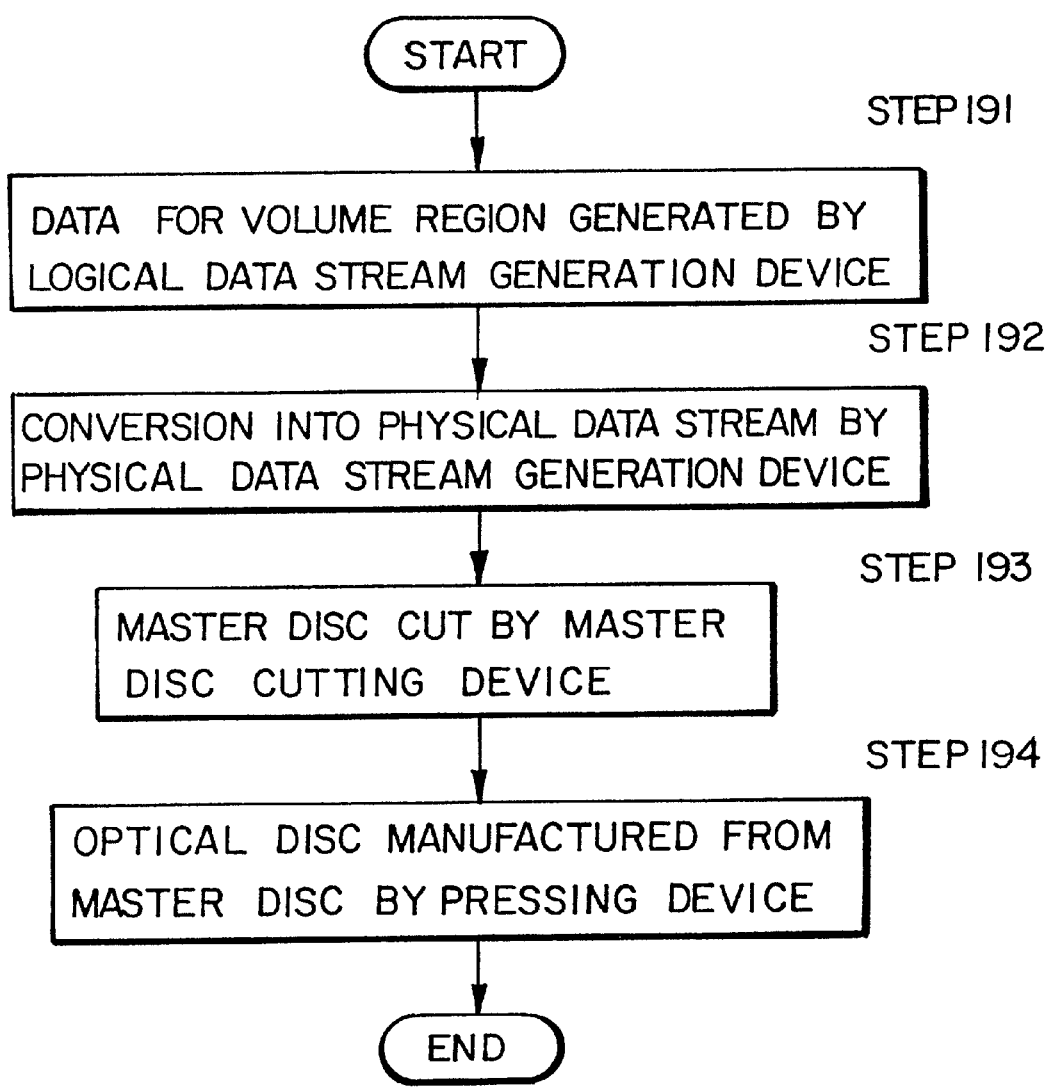

OPTICAL DISC AND REPRODUCTION DEVICE WHICH CAN ACHIEVE A DYNAMIC SWITCHING OF THE REPRODUCED CONTENT

This is a divisional application of U.S. Ser. No. 08/700,116, filed on Aug. 20, 1996, now U.S. Pat. No. 5,895,124.

BACKGROUND OF THE INVENTION

1. Field of the Invention

The present invention relates to an optical disc for storing multimedia data which includes digital moving picture data, audio data and sub-picture data and to a reproduction device for such disc and especially to a technique for the achievement of dynamic switching of the reproduced content.

2. Related Art

In recent years, laser discs and video CDs have been developed as optical storage media for storing multimedia data which is a mixture of moving pictures, audio, sub-pictures and the like.

The following is a simplified explanation of the data format, used by conventional optical discs for moving picture data and audio data which are compressed according to MPEG standard, by which the data called "system streams" are formed.

FIG. 1 is a drawing for explaining the way in which compressed moving picture data and compressed audio data make up these combined data streams called system streams.

In the drawing, "video elementary stream" is a one-dimensional video data stream which has been compressed, with this video data stream being divided into packets which are several bytes long and these packets being numbered "video 1", "video 2" . . . in the drawing. Similarly, "audio elementary stream" is divided into packets which are several bytes long after the left and right channel data has been combined during compression, with these packets being numbered "audio 1", "audio 2" . . . in the drawing. These packets are interleaved in suitable order for the buffer size of the reproduction device and for the reproduction time so as to provide the system streams shown in the drawing.

The following is an explanation of the case when a video CD to be used for karaoke is produced using such system streams.

For such a disc, a premise is supposed where the same background video data is used while one out of "duet", "male part" or "female part" is reproduced. In this case, "duet" requires a system stream in which background video data, to which subtitles for the lyrics of both the male and female parts of the vocal have been added, and audio data, which is only for the accompaniment, are interleaved. "Male part" requires a system stream in which background video data, to which subtitles for the lyrics of only the male part of the vocal have been added, and audio data, which is for the accompaniment and includes a female vocal for the female part, are interleaved. As can be imagined, the "female part" is the opposite of the male part.

For a video CD, it is necessary for these three data compositions to be stored as three different system streams. This is to say, it is necessary for the common background video data to be stored in each of the three system streams.

FIG. 2 shows the system streams in the above situation. In this drawing, system stream 1 is for a duet and so is made up of an interleaving of the background video data, the audio data for the accompaniment and sub-picture data which shows the lyrics for both the male and female parts. System stream 2 is for the male part and so is made up of an interleaving of the background video data, the audio data for the female vocal as well as the accompaniment and sub-picture data which shows the lyrics for only the male part. System stream 3 is for the female part and so is made up of an interleaving of the background video data, the audio data for the male vocal as well as the accompaniment and sub-picture data which shows the lyrics for only the female part. Also, a menu system stream is used to display a menu for selecting one of duet, male part and female part, as well as storing a menu information table which stores information for which system stream is to be reproduced when each of the reproduction system streams (duet, male part, female part) has been selected. In this way, three separate system streams are stored on the video CD corresponding to duet, male part and female part.

However, for conventional video CDs and video CD reproduction of devices, there has been the problem that after the reproduction a system stream for any of the "duet", the "male part" or the "female part" has started, it is not possible to change to a different part without stopping the flow of the reproduction, which is to say, without stopping the video data.

More specifically, for the same example of a karaoke video CD, it has not been possible for a user who wishes to switch to "duet" during the reproduction of the "female part" audio part to switch to the "duet" audio part. This is because the songs corresponding to "duet", "male part" and "female part" are expressed using separate system streams. This is to say, the menu information table can only be used at the start of reproduction of a system stream, so that it is not possible to have reproduction started at an address in the "duet" system stream which is synchronized to a current reproduction address in the "female part" system stream.

Also, for such a video CD, it is necessary to store the main video data which is common to different system streams in each system stream, which reduces the storage efficiency of the disc.

SUMMARY OF THE INVENTION

The object of the present invention is to provide an optical disc which stores a plurality of sets of audio data and a plurality of sets of sub-picture data which are interleaved with moving picture data for which the audio data and sub-picture data which are reproduced with moving picture data can be dynamically changed, as well a reproduction device for such a disc.

A secondary object of the present invention is provide an optical disc which has a data construction which can effectively reproduce the content of video data and a reproduction device for such disc.

A multimedia optical disc for achieving the stated object is a multimedia optical disc which includes a data region for storing at least one object which includes video data, audio data and sub-picture data, wherein the data region is made up of a plurality of small regions, wherein an object is stored in consecutive small regions and wherein each small region includes a first subregion for storing a set of video data of a certain reproduction period, a plurality of second subregions which each store an set of audio data, wherein sets of audio data stored in different second subregions express different reproduction audio to each other and each set of audio data is data to be reproduced at a same time as the set of video data in a first subregion, a plurality of third subregions which each store a set of sub-picture data, wherein sets of sub-picture data stored in different third subregions express different images to each other and each set of sub-picture data is data to be reproduced at a same time as the set of video data in the first subregion and a fourth subregion for storing a set of control information, wherein each set of control information is valid for a reproduction period of data in a same small region and wherein the control information includes an indication to a reproduction device for a combination of one set of audio data out of the second subregions and one set of sub-picture data out of the third subregions which are to be reproduced together with the set of video data in the first subregion.

By means of the stated construction, the control information in a small region is always read along with the video data, so that dynamic switching of the audio data and sub-picture data can be performed by the reproduction device, even during the reproduction of an object. A user can also switch to a desired combination for the content of a title.

Also, the multimedia optical disc may include a plurality of sectors which are formed in a spiral track, wherein each small region is made up of consecutive sectors and wherein the video data of the first subregion, the sets of audio data in the second subregions, the sets of sub-picture data in the third subregions and the set of control information in the fourth subregion are recorded on the optical disc using at least one sector each.

By means of the above construction, linear reading becomes possible for the reproduction device when reproducing objects. Putting this another way, the aforementioned combination can be switched without performing a head seek operation.

Also, the multimedia optical disc may be formed of a first transparent substrate and a second transparent substrate of an approximately equal thickness of between 0.5 mm and 0.7 mm which are joined together with at least one information layer between them, the information layer including the plurality of small regions.

By means of the stated construction, a storage medium with a large storage capacity may be used as the multimedia optical disc.

Also, the control information stored in a fourth subregion may be of a unit length for storage by the reproduction device.

By means of the stated construction, the size of the buffer in the reproduction device for storing the control information can be reduced.

Also, some sets of control information may include flags for prohibiting one of storage and updating of a set of control information by the reproduction device.

By means of the stated construction, for a case where control information with the same content is to be set for a plurality of consecutive small regions, only the control information in the first of such small regions needs to be set, with the rest of the small regions merely having the flag which prohibits updating set. By doing so, more efficient use of the storage capacity of the optical disc can be made.

Also, during reproduction of a multiangle object, the control information may include an angle command for indicating a change of angle to the reproduction device, a multiangle object being a plurality of objects which include different sets of video data which are selectively reproduced during a same reproduction period, wherein each of the regions storing one of the objects in the multiangle object may store a set of video data using a plurality of consecutive first subregions, and wherein the angle command may reflect an interactive process for the reproduction device and may be a branch reproduction command from a small region currently being reproduced to a small region of a different object in the multiangle object, the angle command indicating a branch to a small region which has a set of video data which is synchronized to follow a set of video data in the first subregion of the object from which the branch is performed.

By means of the stated construction, angle switching can be performed during the reproduction of a multiangle object without halting the reproduction.

Also, at least one set of sub-picture data in the third subregion may include a plurality of display item images for expressing a combination of a set of audio data in a second subregion and a set of sub-picture data in a third subregion, and wherein the control information may include a plurality of commands each of which is related to a display item image, with one of the commands being selected and executed in accordance with an interactive process for the reproduction device.

By means of the stated construction, a user can easily select their desired combination of audio data and sub-picture data, even when there are a great number of combinations of audio data and sub-picture data.

A multimedia optical disc reproduction device for achieving the stated object is a reproduction device for reproducing a multimedia optical disc, wherein the multimedia optical disc includes a data region for storing at least one object which includes video data, audio data and sub-picture data, wherein the data region is made up of a plurality of small regions, wherein an object is stored in consecutive small regions and wherein each small region includes a first subregion for storing a set of video data of a certain reproduction period, a plurality of second subregions which each store an set of audio data, wherein sets of audio data stored in different second subregions express different reproduction audio to each other and each set of audio data is data to be reproduced at a same time as the set of video data in a first subregion, a plurality of third subregions which each store a set of sub-picture data, wherein sets of sub-picture data stored in different third subregions express different images to each other and each set of sub-picture data is data to be reproduced at a same time as the set of video data in the first subregion and a fourth subregion for storing a set of control information, wherein each set of control information is valid for a reproduction period of data in a same small region and wherein the control information includes an indication to a reproduction device for a combination of one set of audio data out of the second subregions and one set of sub-picture data out of the third subregions which are to be reproduced together with the set of video data in the first subregion, wherein the reproduction device comprises a reading unit for consecutively reading data from the multimedia optical disc, a separating unit for separating a set of video data, a plurality of sets of audio data, a plurality of sets of sub-picture data and a set of control information from the read data, an audio selecting unit for selecting one set of audio data from the separated plurality of sets of audio data, a sub-picture selecting unit for selecting one set of sub-picture data from the separated plurality of sets of sub-picture data, a control unit for controlling the audio selecting unit and the sub-picture selecting unit based on the set of control information separated by the separating unit and an output processing unit for decoding the separated set of video data, the selected set of audio data and the selected set of sub-picture data and outputting an image signal and an audio signal based on a decoding result.

By means of the stated construction, the control information in a small region is always read along with the video data, so that dynamic switching of the audio data and sub-picture data can be performed by the reproduction device, even during the reproduction of an object.

Also, the control unit may include a buffer unit for storing a set of control information which is updated every time a new set of control information is separated by the separating unit and a selection control unit for controlling a selection made by the audio selecting unit and the sub-picture selecting unit to select a set of audio data and a set of sub-picture data which area indicated by a command in the set of control information stored by the buffer unit.

By means of the stated construction, the reproduction device is such that the control information in the buffer is regularly updated, so that a buffer with only a small capacity may be used.

Also, the control information may include a plurality of commands which each correspond to a combination of a set of audio data in a second sub-region and a set of sub-picture data in a third sub-region, and wherein the reproduction device may further include a operation receiving unit for receiving a selection indication made by a user operation relating to a combination of a set of audio data and a set of sub-picture data, wherein the selection control unit specifies the combination based on the selection indication received by the operation receiving unit and controls the selection made by the audio selecting unit and the sub-picture selecting unit in accordance with a corresponding command.

By means of the stated construction, a user can easily select their desired combination of audio data and sub-picture data, even when there are a great number of combinations of audio data and sub-picture data.

Also, a multiangle object may be stored in the data region of the multimedia optical disc, a multiangle object being a plurality of objects which include different sets of video data which are selectively reproduced during a same reproduction period, wherein each of the regions storing one of the objects in the multiangle object may store a set of video data using a plurality of consecutive first subregions, wherein the set of control information may further include an angle command, the angle command being a branch reproduction indication which indicates a branch from a small region to which the set of control information belongs to a small region of a different object in the multiangle object, the angle command indicating a branch to a small region which has a set of video data which is synchronized to follow a set of video data in the first subregion of the object from which the branch is performed, wherein the operation receiving unit may also receive an angle switching indication made by means of a user operation and wherein the reproduction device may further include a reading control unit for controlling the reading unit, when an angle switching indication has been received and an angle command is included in the set of control information in the buffer unit, to read data from consecutive small regions starting from a small region indicated by the angle command.

By means of the stated construction, angle switching can be performed during the reproduction of a multiangle object without halting the reproduction.

Also, at least one set of sub-picture data in the third subregion may include a plurality of item images for expressing a combination of a set of audio data in a second subregion and a set of sub-picture data in a third subregion, wherein each of the plurality of commands may be related to an item image and wherein the operation receiving unit may receive a selection of an item image by a user operation, when a set of sub-picture data which expresses the plurality of item images is outputted by the output processing unit.

By means of the stated construction, a user can easily and interactively select a desired combination.

Also, a set of control information may include a prohibiting flag for prohibiting updating of a control information storage buffer by the reproduction device, and wherein the buffer unit temporarily stops the updating when the prohibiting flag is set.

By means of the stated construction, for a case where control information with the same content is to be set for a plurality of consecutive small regions, only the control information in the first of such small regions needs to be set, with the rest of the small regions merely having the flag which prohibits updating set. By doing so, more efficient use of the storage capacity of the optical disc can be made.

BRIEF DESCRIPTION OF THE DRAWINGS

These and other objects, advantages and features of the invention will become apparent from the following description taken in conjunction with the accompanying drawings which illustrate a specific embodiment of the invention. In the drawings:

FIG. 3A and FIG. 3B are cross-sectional views showing the physical construction of a DVD in the embodiment of the present invention;

FIG. 7B shows the detailed data composition for the route information;

FIG. 7C is a table which is an extract of the VOB attributes in the route information;

FIG. 7D is a table which is an extract of the VOB attributes which show a multiangle block;

FIG. 12A shows the appearance of the reproduction system in the present embodiment;

FIG. 12B shows a block diagram for the entire construction of the reproduction device in the present embodiment;

FIG. 22 shows a flowchart for the manufacturing process of the optical disc in the present embodiment.

DESCRIPTION OF THE PREFERRED EMBODIMENT

Figure 1:
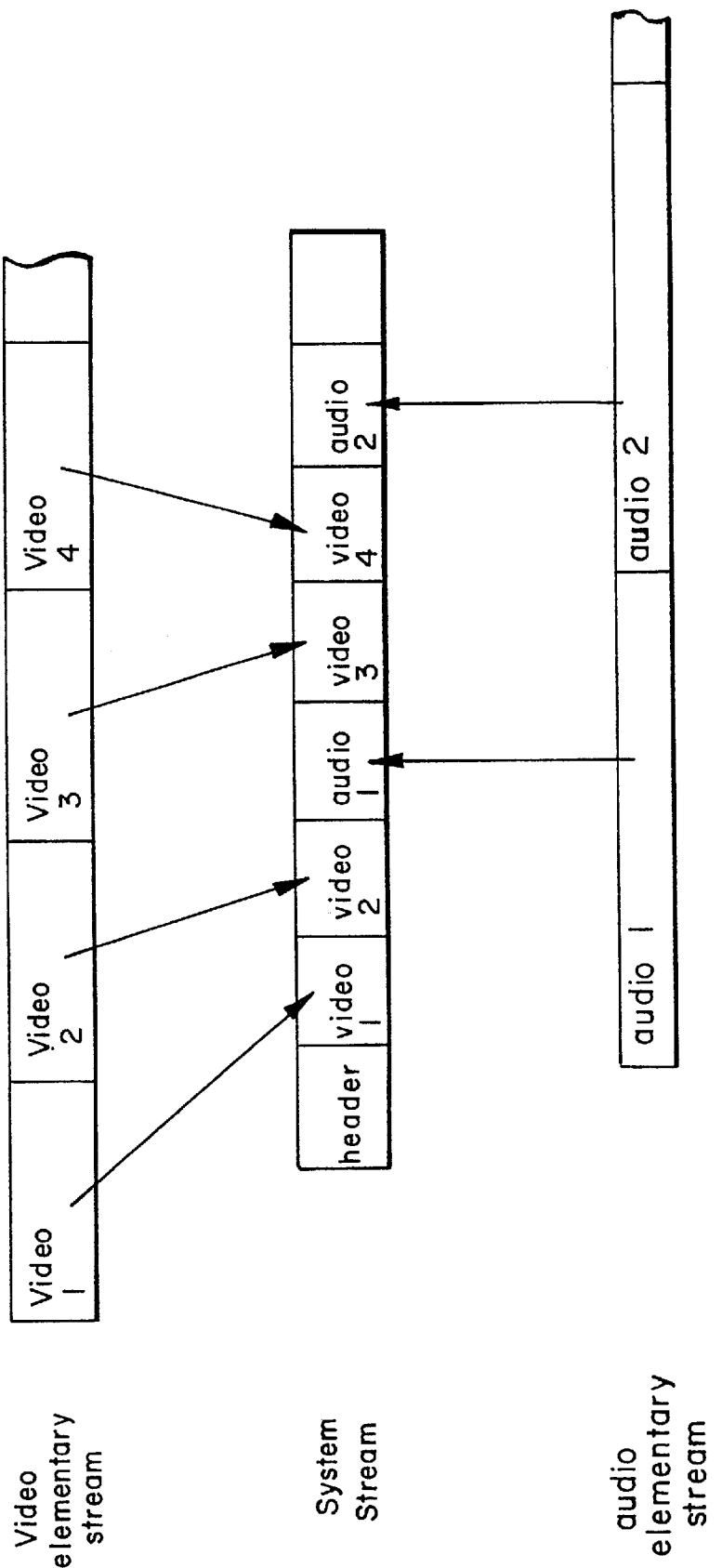
FIG. 1 shows the system stream formed by interleaving one compressed set of moving picture data with one compressed set of audio data, according to conventional techniques.
Figure 2:
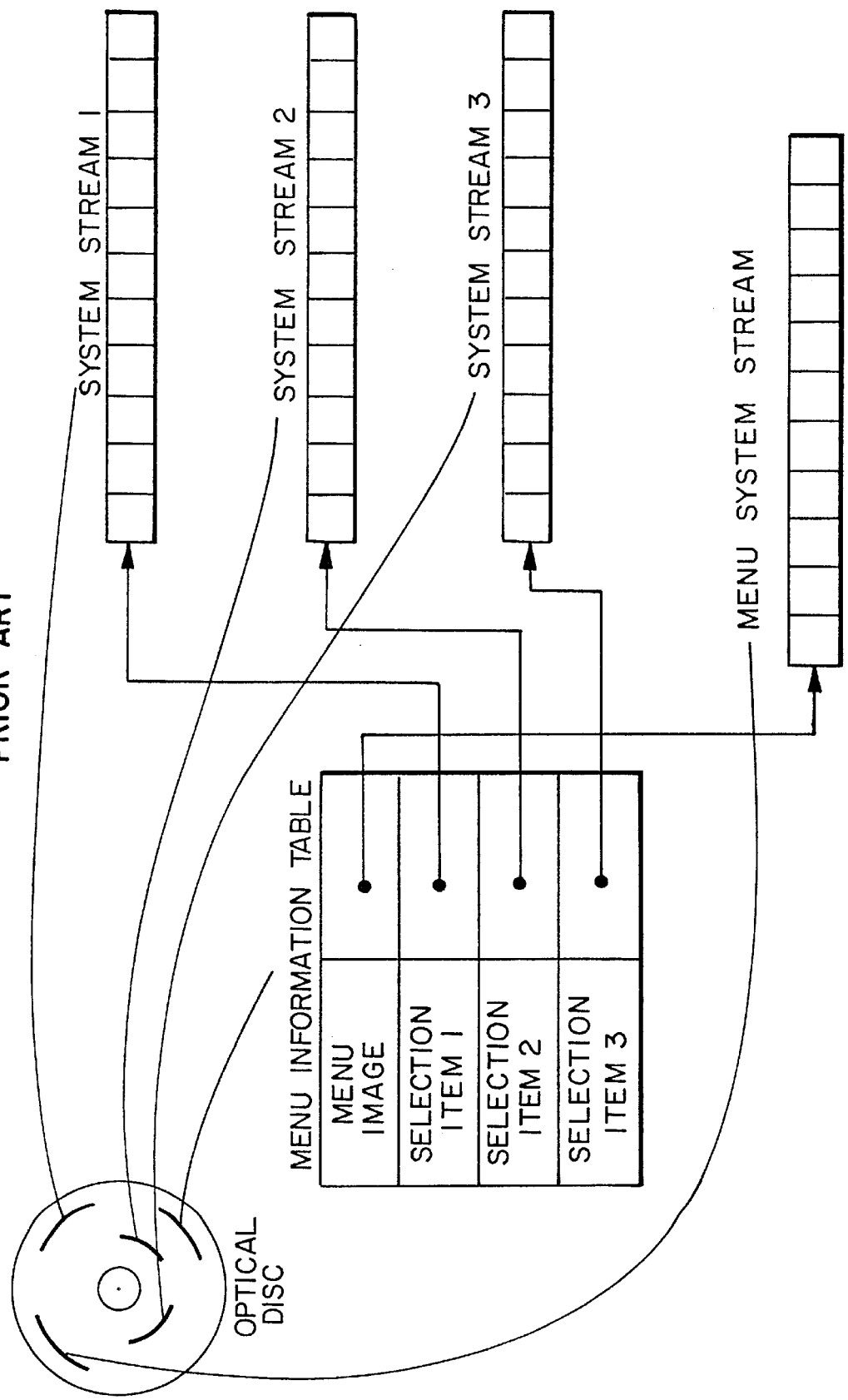
FIG. 2 shows examples of system streams for karaoke data according to conventional techniques.

The following is an explanation of the multimedia optical disc of the present embodiment which refers to an example of a digital video disc (hereinafter, DVD), this being a 120 mm diameter optical disc which has a storage capacity of around 4.7 GB (gigabytes) on one side.

Physical Construction of the Optical Disc

FIGS. 3A and 3B show a cross-section of the DVD. Starting from the bottom, DVD 107 is formed of a first transparent substrate 108 which is around 0.6 mm thick (which is to say, between 0.5 mm and 0.7 mm thick), on top of which an information layer 109 made of a reflective membrane such as metal foil is attached, with a bonding layer 110 and then a second transparent substrate 111 being formed on top of the information layer 109. If necessary, a print layer 112, or in other words a printed label, is printed on top of the second transparent substrate 111, with it not being necessary for this print layer 112 to cover the entire disc.

In this drawing, the bottom side of the disc onto which light beam 113 is shone and from which information is read is set as the front surface A, while the top side of the disc with the print layer 112 is set as the rear surface B. Here, indented and protruding pits are formed in the information layer 109 side of the first transparent substrate 108 by a manufacturing process so that information can be recorded by varying the length of pits and the intervals between them. This is to say, the indentations and protrusions of the pits in the first transparent surface 108 are imprinted into the information layer 109. The lengths of the pits and intervals for this disc are shorter than on a conventional CD, with the pitch of the information tracks in which the pit streams are formed also being narrower, which results in improved surface storage density.

The surface A side of the first transparent substrate 108 in which pits are not formed is flat. The second transparent substrate 111 is a reinforcer and is made of the same thickness (around 0.6 mm) of the same material as the first transparent substrate 108, with both of its surfaces being flat.

Information is retrieved from this kind of disc by shining the light beam 113 on the disc and measuring changes in the reflection ratio of the light spot 114. The light spot 114 on a DVD has a diameter of around $\frac{1}{1.6}$ times the diameter of a light spot on a conventional CD due to an increase in the numerical aperture NA of the objective lens and a reduction in the wavelength $\lambda$ of the light beam.

DVDs of the physical construction described above can store around 4.7 GB of information on one side, which is almost eight times the storage capacity of a conventional CD. As a result, it is possible to achieve a great improvement in picture quality for moving pictures and to increase the reproduction time from the 74 minutes which was possible with a video CD to over two hours. This high storage capacity makes DVDs very suitable for use as storage media for moving pictures.

The substrate technique which has enabled this improvement in storage capacity is a reduction of the spot diameter D of the light beam. Here, spot diameter D is given by the equation "D=laser wavelength $\lambda$/numerical aperture of objective lens NA", so that the spot diameter D can be reduced by reducing the laser wavelength $\lambda$ and by increasing the numerical aperture of objective lens NA. It should be noted here that if the numerical aperture of objective lens NA is increased, comatic aberration occurs due to the relative inclination, known as "tilt", between the optical axis of the beam and the disc surface. In order to suppress this phenomenon, DVDs use a transparent substrate of reduced thickness. Such a reduction in the thickness of the transparent substrate creates the problem of reduced physical durability for the disc, although this problem can be overcome by reinforcing DVDs with another substrate. Here, it is especially desirable to have the two substrates formed of the same thickness of the same material.

Data is read from DVDs using an optical system with a short wavelength (650 nm) red semiconductor laser and an objective lens whose NA (numerical aperture) can be enlarged up to 0.6 mm. If the thickness of the transparent substrate is reduced to around 0.6 mm, a storage capacity of around 4.7 GB can be achieved for one side of a 120 mm diameter optical disc. With this large storage capacity of 4.7 GB, there is more than enough capacity for a whole feature film to be recorded on one disc, with it further being possible for the manufacturer to include soundtracks in several different languages. In fact, the storage capacity of 4.7 GB achieved by this substrate techniques allows the storage of several sets of video and audio data on a same disc.

Video Objects Recorded on a DVD

Figure 4:
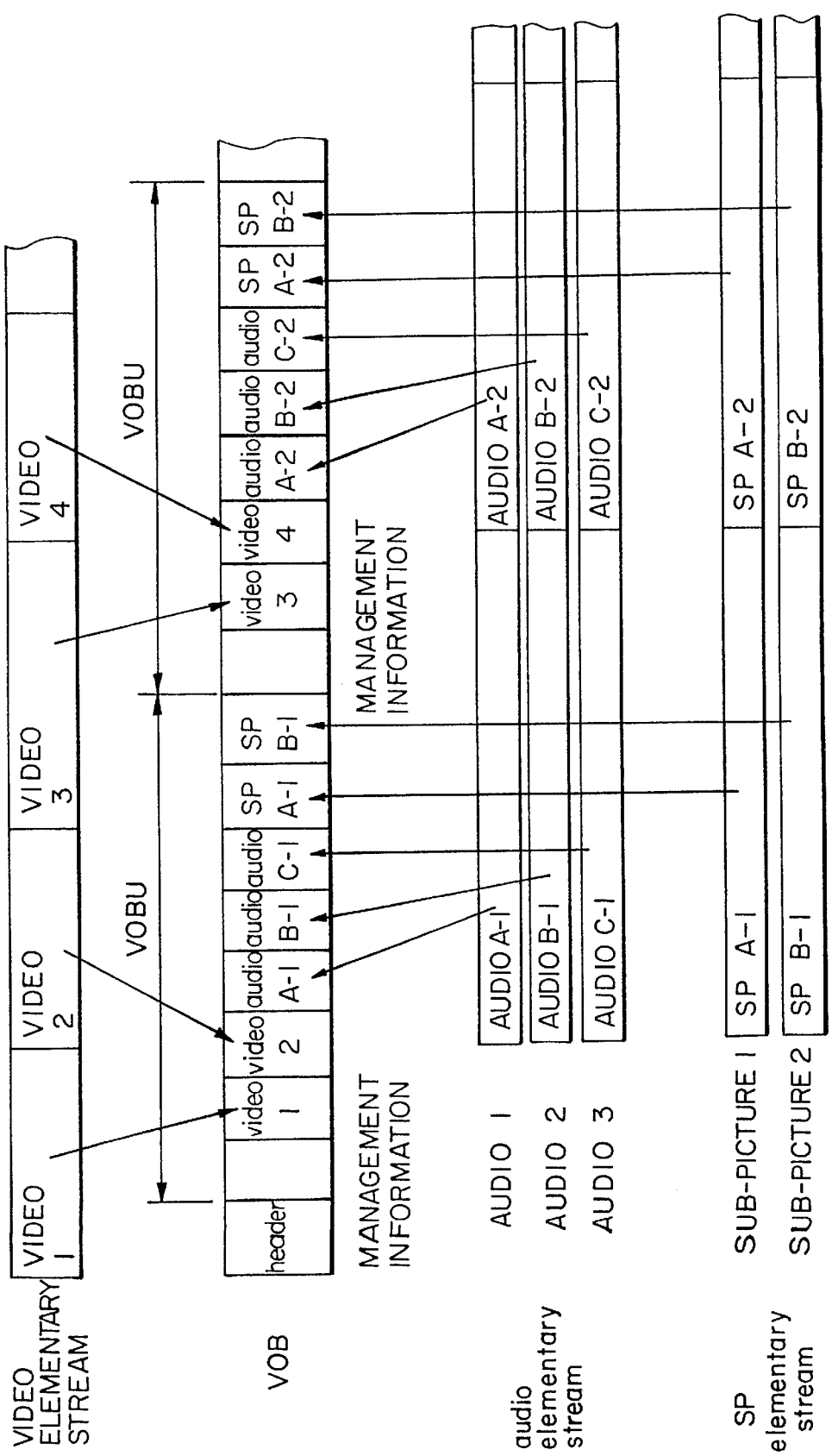
FIG. 4 shows the how the compressed video data and compressed audio data make up the combined data streams called video objects.

FIG. 4 shows how the compressed video data and compressed audio data make up the combined data streams called video objects. These video objects recorded on the DVD correspond to the system streams of the related art shown in FIG. 1, although, since there are differences in data composition, these streams are called video objects (hereinafter abbreviated to VOB) for ease of understanding in the present embodiment.

FIG. 4 drawing shows the original video elementary stream, audio elementary stream and sub-picture elementary stream together with a VOB. This illustrated example conforms to the compression method and data format stipulated under MPEG2 (Moving Pictures Experts Group IS013818).

In this example, "video elementary stream" is a serial video data stream which has been compressed and divided into intervals called Groups of Pictures (GOPs) which are expressed as "video 1, video 2, video 3 . . . " in the drawing. Here each GOP includes around twelve to fifteen frames of conventional video data which equates to a reproduction time of 0.5–1.0 second. In FIG. 4, each GOP unit is made up of a plurality of video packs which have been pack converted in units of 2 KB (kilobyte) length.

Similarly, "audio elementary stream" is composed of an audio signal including left/right channel components of stereo sound and a surround component which have been combined during compression, with three kinds of audio A, B and C being expressed as "audio A-1, audio A-2 . . . ", "audio B-1, audio B-2 . . ." and "audio C-1, audio C-2 . . . " in the drawing. Here, each of audio A-1, audio A-2 . . . is made up of at least one audio data pack which has been pack converted in units of 2 KB (kilobyte) length.

"Sub-picture elementary stream" is a data stream which includes compressed graphics, with there being two kinds of sub-picture which are expressed as "SP A-1, SP A-2 . . . " and "SP B-1, SP B-2 . . . ". Here, each of sub-picture SP A-1, SP-A2 . . . is made up of at least one sub-picture data pack which has been pack converted in units of 2 KB (kilobyte) length.

This video data stream, audio data stream and sub-picture data stream are interleaved into each VOB. The cycle used for this interleaving is called a GOP unit.

Figure 6:
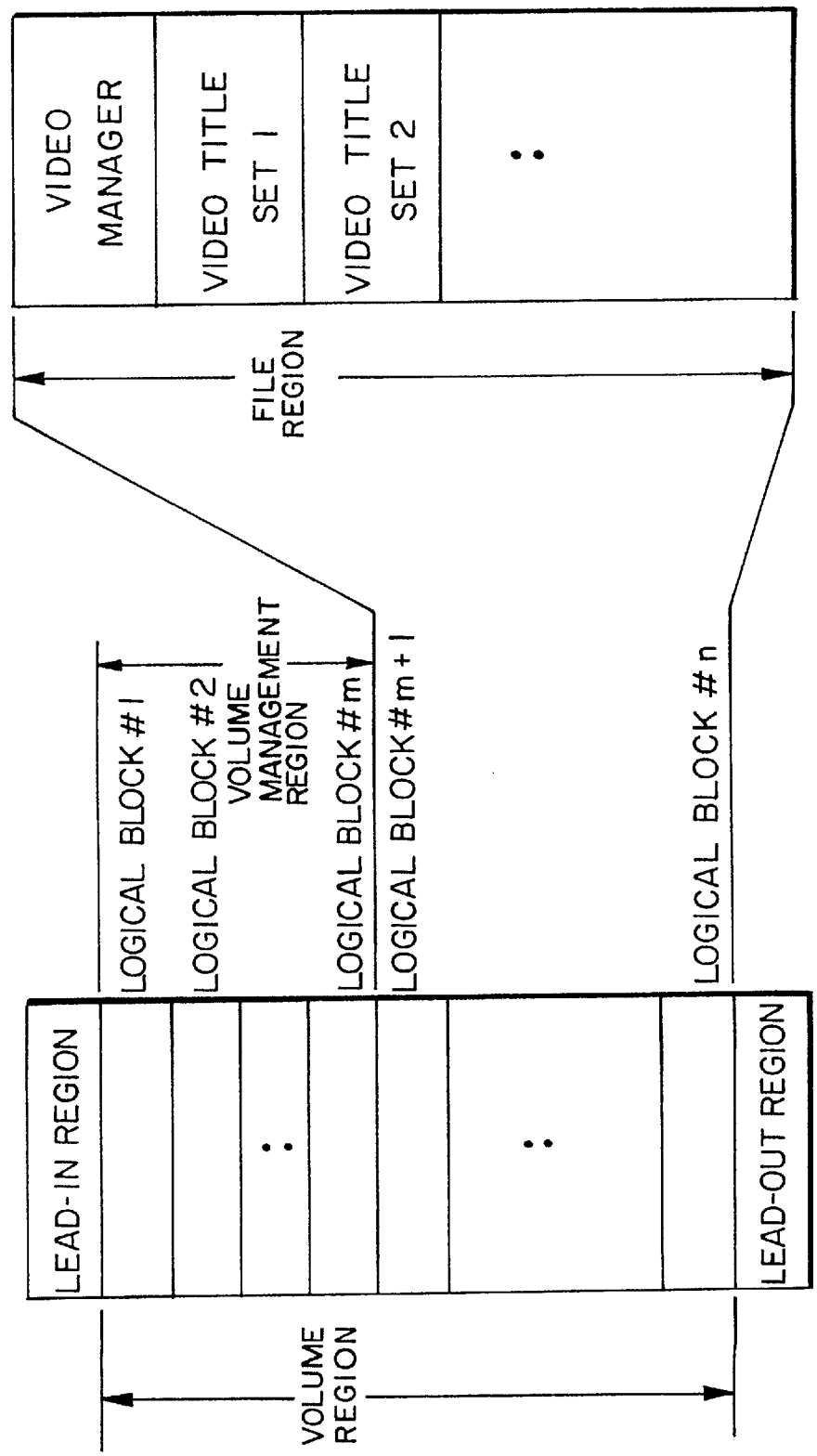
FIG. 6 shows a simplification of the data construction of the entire optical disc in the present embodiment.

It should be noted that in the present embodiment management information is interleaved into VOBs. In these VOBs, the smallest unit for the interleaving of management information with the other kinds of data is called a VOB unit (hereinafter, VOBU). Here, information necessary for interactive reproduction, especially information which enables switching of the audio data and sub-picture data which is reproduced by the reproduction device as an accompaniment to the video data is included in the management information. Each pack is of 2 KB size which is the smallest unit for retrieval from the optical disc, which is to say the same size as each logical block (sector) on the optical disc. This is shown in FIG. 6 and is described later in the text. By means of this arrangement, dynamic reproduction control can be achieved even by a reproduction device which has a small capacity memory.

The above construction for VOBs means that VOBs which store films, for example, can include soundtracks in several different languages and sub-picture data for subtitles in several different languages, in addition to the video data. In such a case, efficient use can be made of the storage capacity of the optical disc by not requiring a plurality of separate system streams like conventional techniques.

Figure 5:
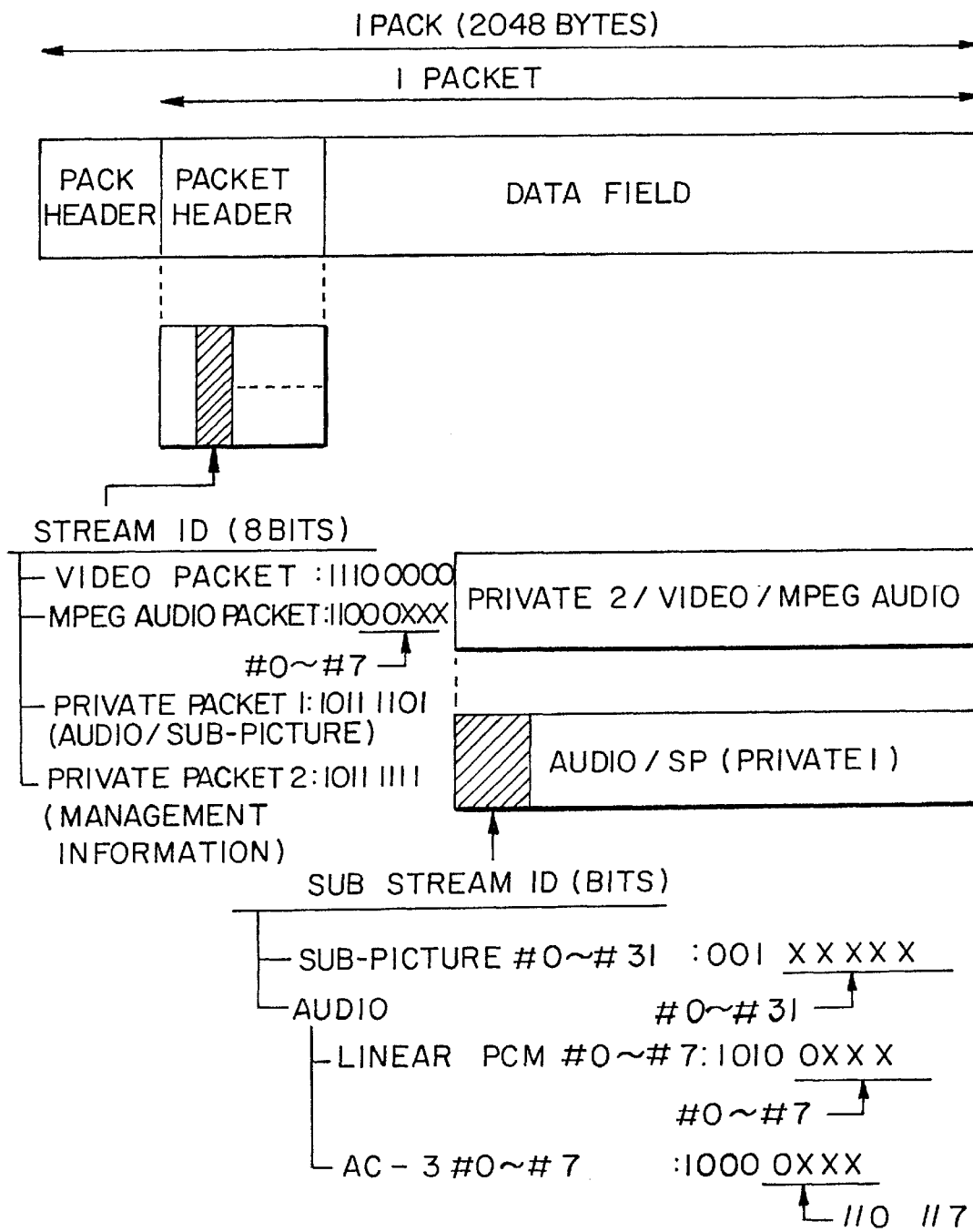
FIG. 5 shows the data composition of each of the video data, audio data, sub-picture data and pack management information which are interleaved in the video objects of the present embodiment.

FIG. 5 shows the data format of each of the video data, audio data, sub-picture data and pack management information which are interleaved in the VOB. Each kind of data in the illustrated VOB has been converted into packets and packs according to MPEG2 standard. In this embodiment, each pack contains one packet called a PES (Packetized Elementary Stream) and is made up of a pack header, a packet header and data which take up 2 Kbytes. The contents of the "pack header" which shows the start of a pack and "packet header" which shows the start of a packet both conform to the MPEG2 standard, so that their explanation has been omitted and the following explanation will focus on the information used to express the different kinds of data.

The "stream ID" included in the packet header is an eight-bit field which shows whether the packet is a video data packet for a video elementary stream, a private packet, or an MPEG audio packet. Here, a "private packet" is data whose content can be freely defined under MPEG2 standard.

In the present embodiment, private packet 1 is defined as audio data and sub-picture data while private packet 2 is defined as pack management information. Private packet 1 further includes a substream ID, which is an eight-bit field showing whether the packet contains audio data or sub-picture data. The audio data defined by private packet 1 has a maximum of eight kinds of settings #0–#7 for linear PCM format or AC-3 format. Also, the sub-picture data has a maximum of thirty-two kinds of settings #0–#31. The stream ID and substreams are used by the reproduction device to determine what kinds of packs are present in the retrieved information and how to separate them.

Here, for video data, the "data" field is made up of MPEG2 compressed data. For audio data, the "data" field is made up of data in one of MPEG, linear PCM or AC-3 format. Finally, for sub-picture data, the "data" field is made up of graphics data which has been compressed using run-length encoding.

Data Composition of the Entire Disc

FIG. 6 shows a simplification of the data construction of the entire optical disc in the present embodiment.

As shown in this drawing, the regions on the optical disc which store data can be broadly classified into a lead-in region, a volume region and a lead-out region. Here, the volume region is further made up of a volume management region and a file region, with this file region being made up of a video manager file (hereinafter, Video Manager) and a plurality of video title set files (hereinafter, Video Title Sets). It should be noted here that although the Video Manager and Video Title Set are explained as each being one file for ease of understanding in the present embodiment, due to the extensive capacity used when storing a movie, for example, it is desirable for the title to be divided into a plurality of files which are consecutively arranged on the optical disc in order to facilitate management by the reproduction device.

The "lead-in region" is located at the innermost part of the optical disc and stores data to stabilize operation at the start of retrieval by the reproduction device.

The "lead-out region" is located at the outermost part of the optical disc and stores data which shows that the volume region has ended.

The "volume region" is located between the lead-in region and the lead-out region and is made up of an extremely large number of logical blocks which are arranged onto a spiral track as a one-dimensional array. Each logical block is made up of 2 KB and is distinguished from each other using a block number (sector address). Here the logical block size is the smallest unit for retrieval by the reproduction device, with the size of each set of video data, audio data, sub-picture data and management data shown in FIG. 5 being the same.

The "volume management region" takes up a necessary number of blocks starting from the first block and is used to manage the entire disc. It stores information for the files in the file region according to IS013346 (International Standards Organization) or other such standard.

The "Video Manager" in the file region expresses the management information for the entire disc. This volume manager includes information for expressing a volume menu which is a menu for setting/changing the reproduction control for the entire volume.

A "Video Title Set" in the file region stores a plurality of VOBs and information for reproduction control of these VOBs, with each Video Title Set having a size which is an integer multiple of logical blocks or, in other words, 2048 bytes*n. Here, when there are three versions of a same movie title, these being a no-cut version, a cinema version and a television version, this Video Title Set is made up of the names of these three versions. Since VOBs can be common to these different versions of the title, both common VOBs and VOBs unique to only one version are recorded in this Video Title Set. The size of one VOB can be set by the software developer to be one scene in a movie, a whole movie, or one song for karaoke.

Data Composition of the Video Title Set

Figure 7A:
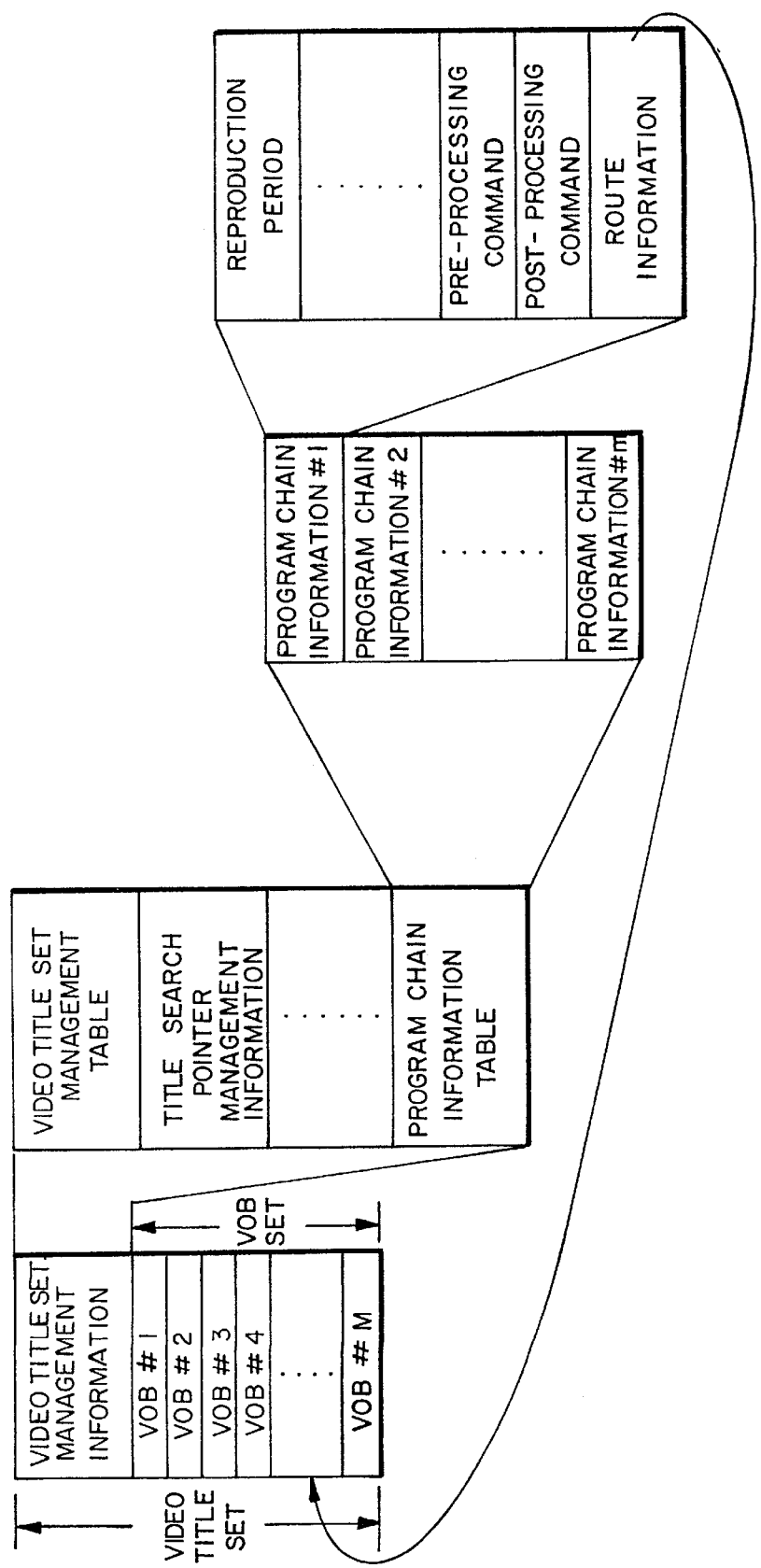
FIG. 7A shows the internal construction of the video title set in the present embodiment.

FIG. 7A shows the internal construction of the Video Title Set shown in FIG. 6. As shown in this drawing, the Video Title Set is made up of video title set management information and VOB sets.

Each "VOB set" is made up of a plurality of VOBs. As shown in FIG. 4, each VOB has a plurality of sets of audio data and a plurality of sets of sub-picture data which are interleaved together with video data.

The "video title set management information" includes a video title set management table, title search pointer management information, a program chain information table and the like.

The "video title set management table" shows the internal construction of the video title set management information" which is to say the contents (such as the kind of information stored or whether there is a table) of the video title set management information.

The "program chain information table" is a table which stores a plurality of entries of program chain information. Here, each entry of program chain information includes information for one program chain, which is to say route information showing a reproduction order of a plurality of VOBs as well as control information relating to the reproduction of the program chain. In this embodiment, a program chain (hereinafter, PGC) is a list of VOBs which is decided by a reproduction order as described above. Here, by setting the route information, the software title developer can freely combine any number of VOBs in their desired order as a PGC.

Each entry of program chain information stores reproduction time, a pre-processing command, a post-processing command and route information.

"Reproduction time" stores the reproduction time of the menu.

A "Pre-processing command" is a control command to be executed before the start of reproduction of a program chain.

A "Post-processing command" is a control command to be executed after the end of reproduction of a program chain. Pre-processing commands and post-processing commands are commands for reproduction branch control and reproduction output control. An example of the former is a LINK command indicating a next PGC to be reproduced while an example of the latter is a SETSTN command for setting the combination of audio data and sub-picture data to be reproduced out of the plurality of sets of audio data and sub-picture data.

The "route information", as shown by the arrow in FIG. 7A, expresses the reproduction order of the VOBs which compose a PGC and includes pointers for indicating the logical address of each VOB in the storage area of the optical disc. The list of these pointers is given in reproduction order of each of the VOBs which form the PGC. For the example in FIG. 7B, the route information for PGC information #1 includes pointers which show each of VOB #1 through #3. By means of this PGC information #1, VOB#1 is reproduced, then VOB#2 is reproduced and finally VOB#3 is reproduced. Also, this route information includes VOB attributes which show whether each of the VOBs indicated by the pointers are part of a multiangle block. Here, a multiangle block is a plurality of VOBs which include video data of a same subject shot at different camera angles or with different views.

The "title search pointer management information" is the list of contents for the Video Title Set and, for each video title included in the Video Title Set, shows the PGC include in the video title and the first PGC to be reproduced when at the start of reproduction.

The following is a detailed description of the route information included in each set of PGC information.

Figure 8A:
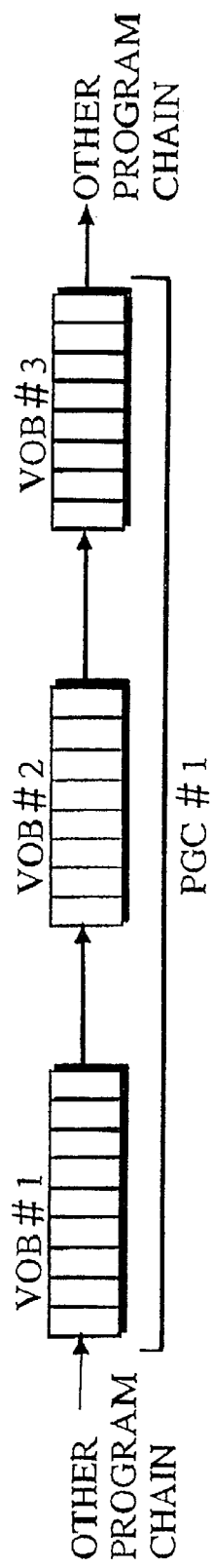
FIG. 8A shows the relationship between program chains and video objects.

FIG. 7B shows the detailed data composition of the route information (hereinafter, route information #1) included in PGC information #1. FIG. 7C is a table which shows information extracted from route information #1 in PGC information #1. As shown in these figures, route information #1 is an arrangement of VOB information #1-VOB information #3 which shows the VOBs which are elements of PGC#1 in reproduction order. Here, one set of VOB information is made up of a pointer which shows the storage area of the VOB and VOB attributes which show the block type and the block mode. Here, the block type shows whether the VOB is an element in a multiangle block (whether it is angle or not angle) and the block mode shows the range of the VOB in the multiangle block when the block type is "angle". Putting this another way, out of the plurality of sets of VOB information in the route information, this shows from which set of VOB information to which set of VOB information the multiangle block is formed. More specifically, it shows whether the position of the VOB information in the block in the route information is the start of the block, the middle of the block or the end of the block. For route information #1 shown in FIG. 7C, an example of normal (non-block) PGC information is shown. As shown in FIG. 8A, by means of this route information #1, VOB#1, VOB#2 and VOB#3 are reproduced in that order.

Figure 8B:
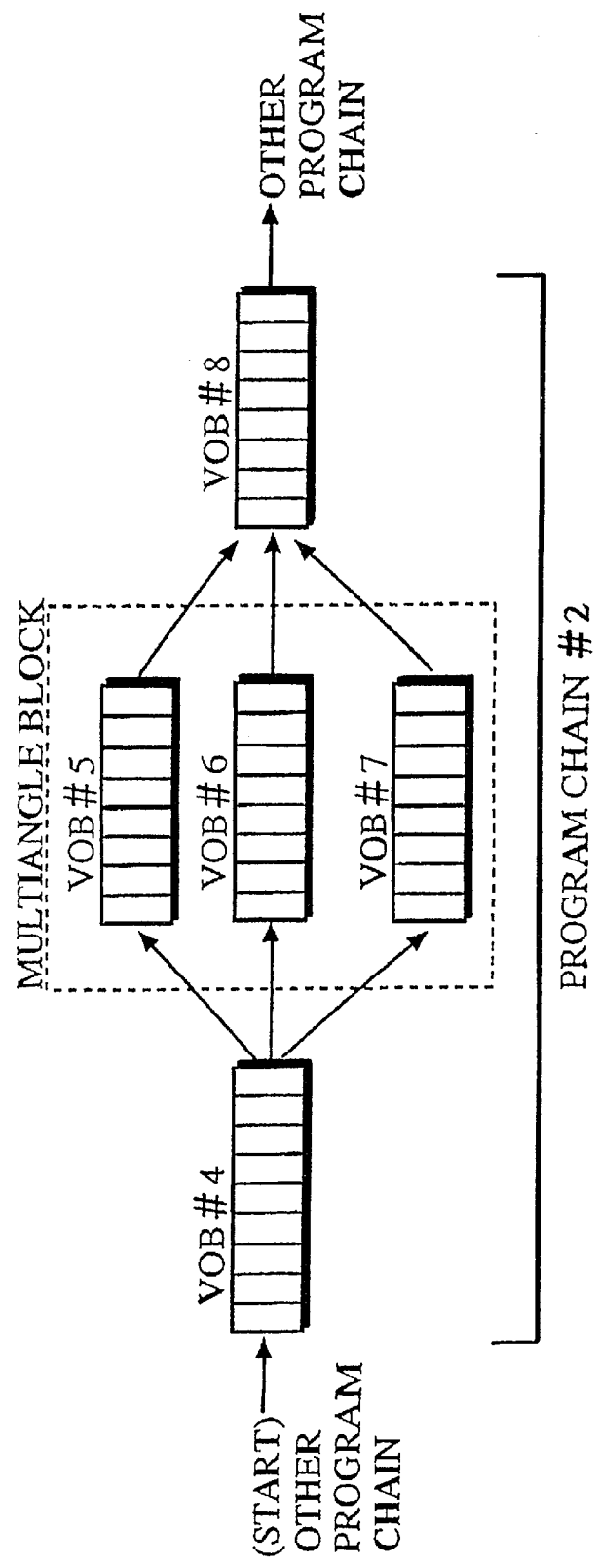
FIG. 8B shows the relationship between program chains and multiangle blocks.

An example of route information (route information #2) which includes a multiangle block is shown in FIG. 7D. Here, PGC#2 which is reproduced by this route information #2 is depicted in FIG. 8B. For the route information #2 given in FIG. 7D, the elements of PGC#2 are VOB#4-#8. Of these, the block type for VOB#4-#7 is multiangle, with their respective block modes being start, middle and end, so that they form the multiangle block shown in FIG. 8B. In this case, PGC#2 does not have VOBs #4, #5, #6, #7 and #8 reproduced in that order, but rather has the reproduction device perform control so that first VOB#4 is reproduced, with this followed by one VOB out of the multiangle block which can be changed by the user making an operation of a remote controller, before VOB#8 is finally reproduced. It should be noted here that the VOB which is to be displayed first in a multiangle block (which is to say the default angle) is the VOB whose block mode is start. For the example shown in FIG. 7D, the VOB to reproduced after VOB#4 is the VOB whose block mode is "start", which is VOB#5.

Data Composition of the Video Manager

Figure 9:
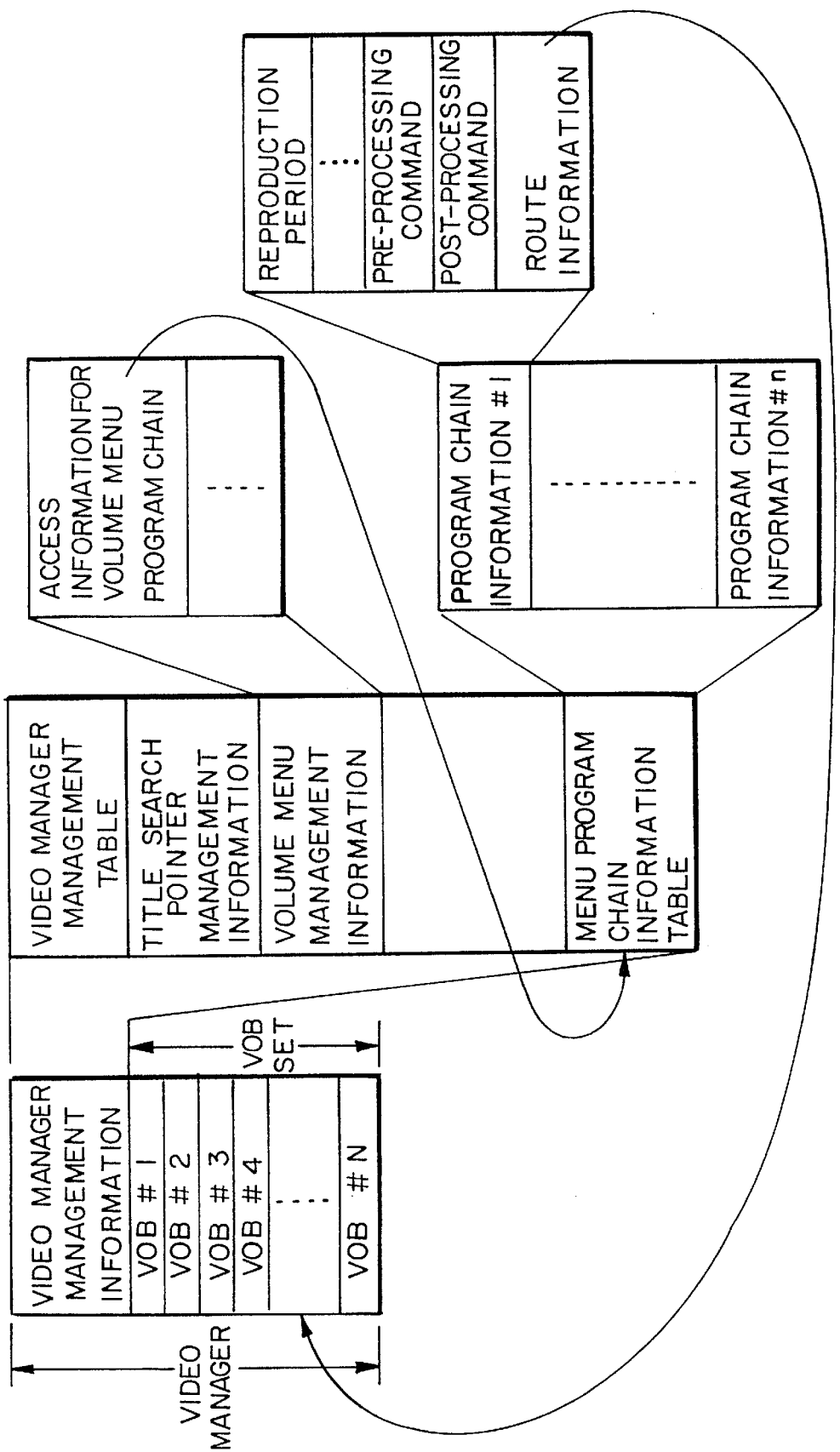
FIG. 9 shows the internal construction of each video manager on the optical disc in the present embodiment.

FIG. 9 shows the internal construction of the video manager shown in FIG. 6. As shown in this drawing, the video manager is made up of video manager management information and a VOB set. Here, video manager management information includes a video manager management table, title search pointer management information, volume menu management information, a PGC information table and the like.

This data construction differs from the composition of the Video Title Set shown in FIG. 7 in that it includes volume menu management information but that the PGC information does not include automatic reproduction branch information, pause reproduction information and menu selection information. Otherwise, the data constructions in FIGS. 9 and 7 are identical, with the elements which are not really necessary having been omitted, so that only the differences will be explained below.

The "video manager management table" shows the internal construction of the video manager management information which is to say the contents (such as the kind of information stored or whether there is a table) of the video manager management information.

The "title search pointer management information" shows a list of contents for each video title in the volume, which is to say to which video title set each video title belongs.

The "volume menu management information" includes access information which is a set of pointers indicating PGC information for the volume menu. Here, the volume menu (hereinafter, the master menu) is a menu for the setting and changing reproduction control of the entire volume and is the menu which is displayed whenever the "menu" key on the remote controller is depressed at any point during the reproduction of the disc. For the case of a karaoke disc, the master menu is a menu for selecting a title (which in this case is a song) recorded in the volume. The data for expressing this menu stored as one or more PGCs. This volume menu management information is can be stored, for example, in a buffer in the reproduction device and then referred to every time a user depresses the "menu" key on the remote controller during reproduction. By doing so, the volume menu can be reproduced in accordance with the referred to access information.

The "menu PGC information table" is a table which stores at least one entry of PGC information for a menu. As shown by the arrow in FIG. 9, this menu PGC information table is indicated by access information included in the volume menu management information. It should be noted here that the volume menu itself is expressed using a plurality of PGCs indicated in this table, so that it may be a hierarchical menu, a voice guidance menu or a menu of any form freely chosen by a title developer.

Data Construction of Management Information in a VOB

Figure 10:
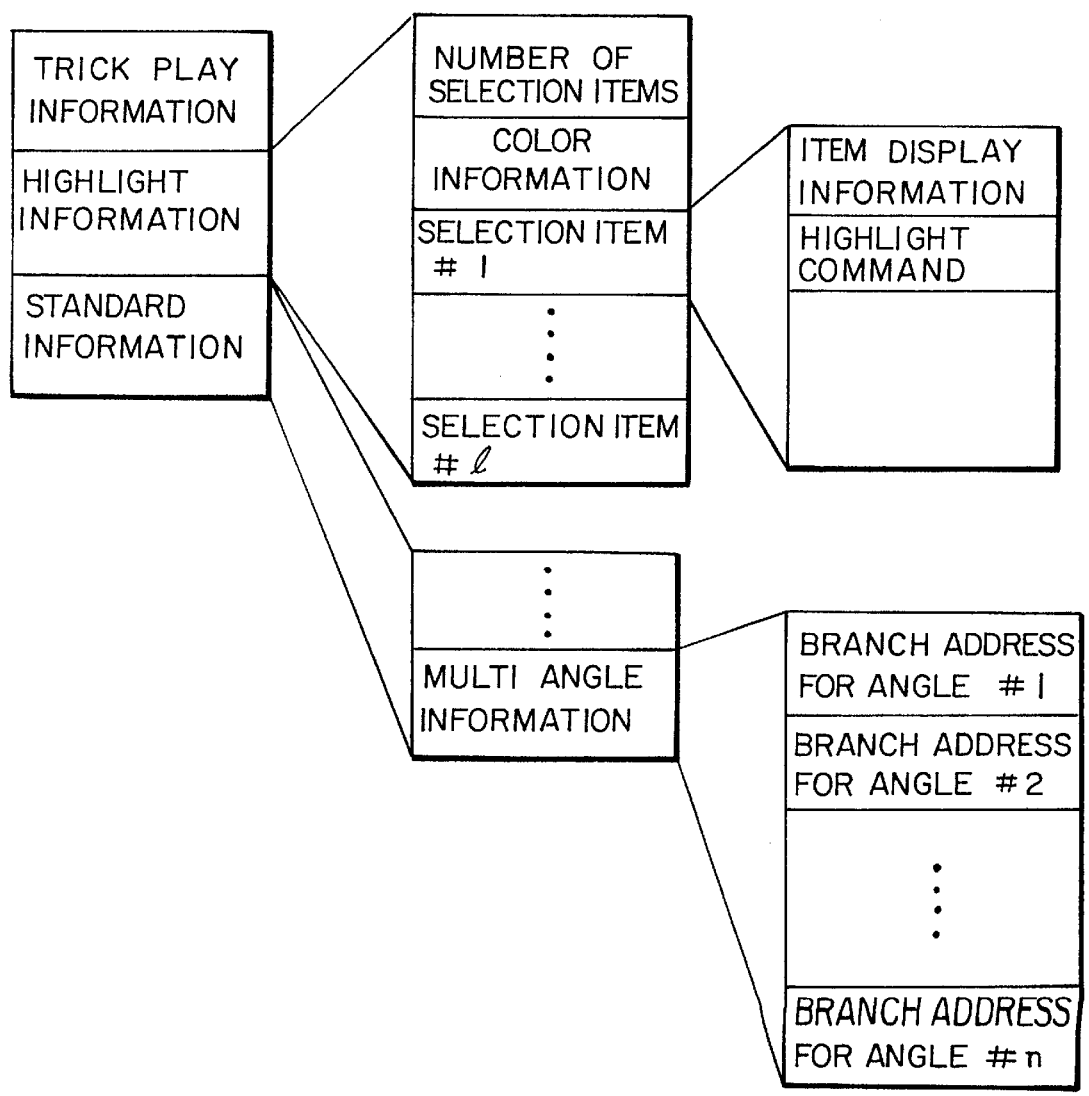
FIG. 10 shows the composition of each set of management information which is interleaved in the VOBs of the present embodiment.

FIG. 10 shows the composition of each set of management information which is interleaved in the system streams shown in FIG. 4. As shown in this drawing, the pack management information is made up of trick play information, highlight information and standard information.

The "trick play information" is information for trick plays, such as jump addresses for fast forward reproduction or rewind reproduction operations.

The "highlight" information shows information which indicates the reproduction control corresponding to a selection of a menu according to an operation using a key on the remote controller and the menu display information which uses the sub-picture data. More specifically, this is made up of a number of selection items, color information, and a plurality of selection items which are themselves each made up of item display information and a highlight command. This information is for realizing interactive processes with the user by inviting user selections by displaying item images using sub-picture data and receiving user selection made with the remote controller. This highlight information is present in each VOBU, so that interactive operations can be achieved at any point during the reproduction of a VOB.

The "number of selection items" expresses the number of items which can be selected by means of a user operation in response to a menu display. As one example, the menu display here can be a display of item images such as selection buttons or selection icons which is achieved using sub-picture data.

The "color information" is information for indicating a change of color when an item is selected or confirmed by a user, to indicate that this item has been selected or confirmed.

The plurality of "selection items" are a same number of pieces of information for indicating items in the menu as given in the "number of selection items" information. In this embodiment, selection items include a plurality of pairings of audio data and sub-picture data, with the free selection of these by the user being possible.

The "item display information" of each selection item expresses the area of the sub-picture for which the color is to be changed when an item is selected. As one example, if the button or icon showing the item is rectangular, this can be expressed using the coordinates of two opposite vertices (corners).

The "commands" in each selection item are the reproduction control commands to be executed when the corresponding menu item is selected and confirmed. LINK commands and SETSTN commands are specific examples of such commands. LINK commands are expressed as "LINK PGC#n" and indicate a jump to PGC #n. Here, #n indicates the number of a PGC information entry in the PGC information table shown in FIGS. 7A and 9. By using such commands, the reproduction device can cancel the reproduction of a current PGC, retrieve the indicated PGC information #n and then commence the reproduction of PGC#n in accordance with the retrieved information. SETSTN commands are expressed as "SETSTN #i, #j" and indicate the reproduction of a combination of audio data #i and sub-picture data #j. Here, #i and #j are the number of the audio data and sub-picture data in the VOBs. By using such commands, the reproduction device switch the reproduction from the audio data and the sub-picture data currently being reproduced to the indicated audio data and the sub-picture data during the reproduction of a current PGC. Also, by setting a third parameter #k in such SETSTN commands so that they become "SETSTN #i, #j, #k", it is possible to indicate an angle number in a multiangle block.

These commands are common to the pre-processing commands, post-processing commands and highlight commands described above. Here, the desirable use of these commands is for the pre-processing commands to be mainly used for initial settings of combinations of audio data and sub-picture data to be used in PGC reproduction, highlight commands to be used for settings and changes in accordance with user operations and post-processing commands to be used for default setting or resetting the entire optical disc. It is also possible to use a plurality of other commands, but since these bear no relation to the present invention, they will not be described.

The "standard information" stores information such as the reproduction functions supported by the data in the GOP, and includes multiangle information as one kind of reproduction function. Multiangle information stores a plurality of VOBs for video of a common subject which is shot at different camera angles and so is information which enables the user to switch to their desired angle during reproduction. More specifically, when then are n VOBs corresponding to angles #1 to #n, the multiangle information is made up of n different jump addresses (logical block addresses) which correspond to each angle number. Here, each jump address is a jump address for a different angle and so indicates the reproduction position of video data which is synchronized to the video data in the VOB which includes this multiangle information.

Figure 11A:
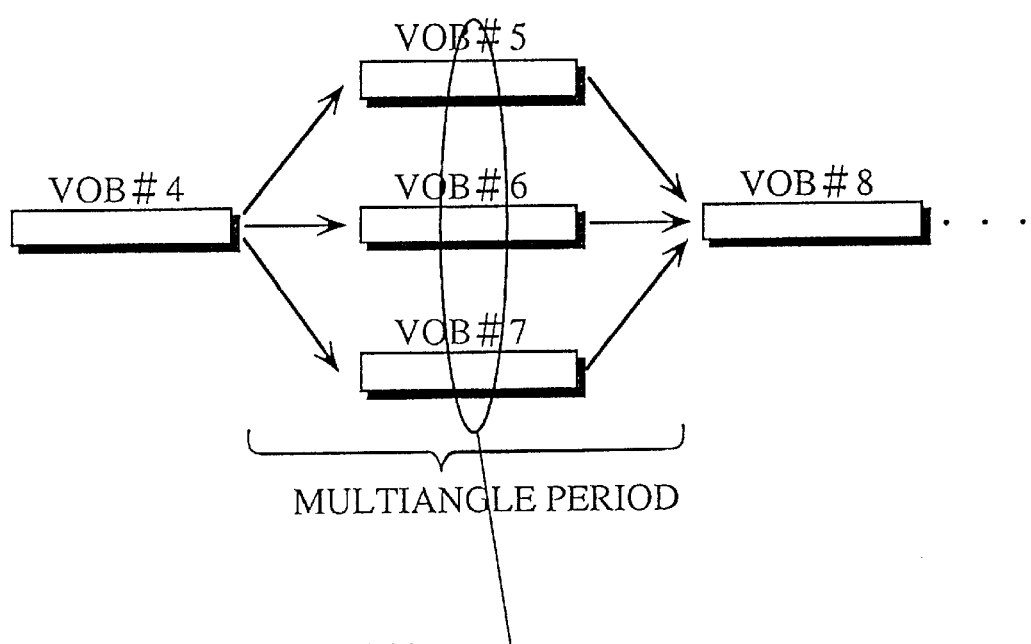
FIG. 11A and FIG. 11B show the multiangle streams controlled by multiangle information in the present embodiment.
Figure 11B:
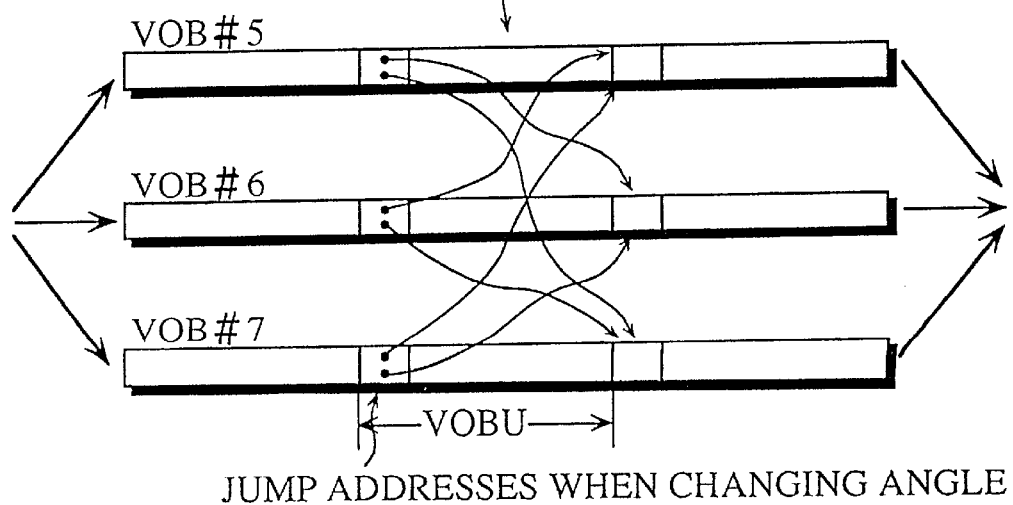

FIG. 11A and FIG. 11B show a multiangle stream controlled by the multiangle information. In this drawing, VOBs #4–#8 are VOBs in PGC#2 shown in FIG. 8B, with VOBs #5–#7 being the multiangle period. The VOBs #5–#7 in this period include video data for a same subject shot at different angles, with switching between them during reproduction being possible using the multiangle information. By doing so, the user can switch between video clips taken at different angles. In the enlargement at the bottom of the drawing, switching between viewpoints using the multiangle information is shown. As described above, multiangle information stores the jump addresses for synchronized reproduction positions in the VOBs of video data for other angles. As one example, the multiangle information in system VOB#5 stores jump address information for VOB#6 and jump address information for VOB#7. In the illustrated example, VOB#6 and VOB#7 contain similar information. An angle menu is displayed when the user depresses the "angle" key on the remote control 91 so that the user can indicate his/her desired angle. Once an angle has been indicated, reproduction is commenced at the jump address corresponding to the indicated angle by the reproduction device.

Having explained the data construction stored on the disc in the present embodiment, the following is a description of the reproduction device for the optical disc having this data construction.

Outline of the Reproduction System

FIG. 12A shows the appearance of the reproduction system of the present embodiment which is made up of a reproduction device, a monitor and a remote controller.

As can be seen in the drawing, the reproduction device 1 reproduces the DVD shown in FIG. 3A in accordance with operation indications made using the remote controller 91 and outputs an image signal and an audio signal. Here, the operation indications made using the remote controller 91 are received by the remote control reception unit 92 of reproduction device 1.

Display monitor 2 receives the image signal and the audio signal from reproduction device 1 and displays an image output and an audio output. This display monitor 2 can be a conventional television set.

Entire Construction of the Reproduction Device

FIG. 12B shows a block diagram for the entire construction of the reproduction device in the present embodiment. The reproduction device is made up of a motor 81, an optical pickup 82, a mechanism control unit 83, a signal processing unit 84, an AV decoder unit 85, a system decoder 86, a remote controller 91, a remote control reception unit 92 and a system control unit 93. The system decoder 86 is further composed of a video decoder 87, a sub-picture decoder 88, an audio decoder 89 and an image combining unit 90.

The mechanism control unit 83 controls the mechanism which includes the motor 81 for driving the disc and the optical pickup 82 for reading the signal recorded on the disc. More specifically, the mechanism control unit 83 adjusts the speed of the motor in accordance with the track position indicated by the system control unit 93 while at the same time moving the pickup position by driving the actuator of the optical pickup 82 and, having detected a desired track through servo control, waits until the revolution of the disc has reached the point where the desired sector is recorded before finally continuously reading the signal from the desired position.

The signal processing unit 84 executes signal processing, such as amplification, wave-shaping, demodulation, and error correction, for the signal read by the optical pickup 82. After this, it stores the signal in logical block units in the buffer memory (not illustrated) of system control unit 93. The data in the buffer memory is read by the system control unit 93 in accordance with the video title set management information and the video manager management information and is transferred from the buffer memory to the system decoder 86 by the system control unit 93 for each VOB.

The AV decoder unit 85 converts the received system stream data into the original video signal and audio signal.

The system decoder 86 determines the stream ID and subsystem stream ID for each packet included in the VOBs transferred from the buffer memory and outputs video data to the video decoder 87, audio data to the audio decoder 89, sub-picture data to the sub-picture decoder 88 and pack management information to the system control unit 93. In doing so, the system decoder 86 outputs to the audio decoder 89 and the sub-picture decoder 88 only the audio data and sub-picture data whose number corresponds to the numbers indicated by the system control unit 93, out of the plurality of pieces of audio data and sub-picture data, with the remaining pieces of data being discarded. The management information outputted by the system control unit 93 is stored in a different buffer to the aforementioned buffer memory. This buffer is updated every time new management information is outputted.

The video decoder 87 decodes the video data inputted from the system decoder 86 and, having decompressed the data, outputs it as a digital video signal to the image combining unit 90.

When the sub-picture data inputted from the system decoder 86 is run-length compressed image data, the sub-picture decoder 88 decodes it, decompresses it and outputs it in the same format as the video data to the image combining unit 90. In doing so, it is possible for the colors in the image data to be changed in accordance with the color information. Also, when the sub-picture decoder 88 includes a graphics processing unit and the sub-picture data includes a program for indicating a graphics process and data to be used by the process, the data can be processed by the graphics processing unit before being outputted. By doing so, visual effects which were not conventionally possible can be created.

The audio decoder 89 decodes the audio data inputted from the system decoder 86, decompresses it and outputs it as digital audio data.

The image combining unit 90 combines the output of the video decoder 87 and the output of the sub-picture decoder 88 according to proportions indicated by the system control unit 93 and outputs the result as a video signal. This signal is converted into an analog signal and is then inputted into a display device, such as display monitor 2.

Figure 13:
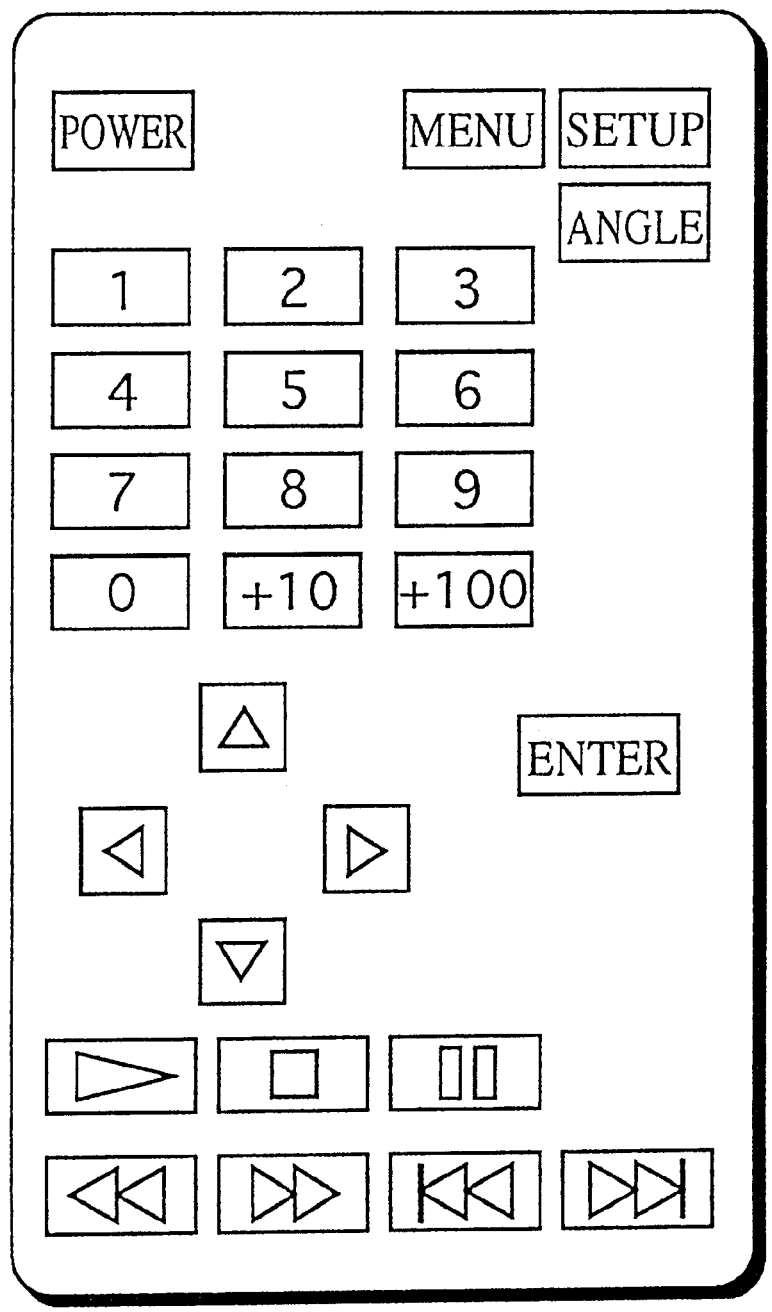
FIG. 13 shows an example of a key arrangement on the remote controller in the present embodiment.

The remote controller 91 receives reproduction control indications made by user operations. An example key layout of the remote controller 91 is shown in FIG. 13. The following is a brief explanation of only the keys which specifically relate to the present invention. The "menu" key is used to call the universal menu which can be displayed at any point during reproduction. The numeral keys and arrow keys are used for making menu selections. The "enter" key is used for confirming a selected menu item. Finally, the "angle" key is used for switching angle during multiangle reproduction.

The remote control reception unit 92 receives the key signal infrared transmitted from the remote controller 91 in response to the depression of a key and informs the system control unit 93 of the key data using an interrupt process.

The system control unit 93 controls the entire reproduction device. It is composed of a program memory for storing a program for realizing the functions of the system control unit, a buffer memory for storing data for logical blocks and a CPU for executing the program. More specifically, when the data read from the buffer memory is video title set management information or video manager management information, the system control unit 93 stores the information in another buffer (not illustrated, but hereinafter called the "first buffer") and performs reproduction control for the signal processing unit 84 in accordance with the content of this information, while when the data is a VOB, the data is directly transferred from the buffer memory to the system decoder 86. For the mechanism control unit 83, the system control unit 93 calculates the number of the track on the disc which corresponds to the next logical block to be read, indicates the track position and indicates block reading control to the mechanism control unit 83. Also, on being interrupted by the remote control reception unit 92, the system control unit 93 is informed of the key data corresponding to the depressed key and performs reproduction control corresponding to the key data. The system control unit 93 also receives the management information in a VOBU from the system decoder 86, temporarily stores it in a buffer (not illustrated, but hereinafter called the "second buffer") and performs reproduction control in accordance with the content of this information.

Construction of System Decoder 86

Figure 14A:
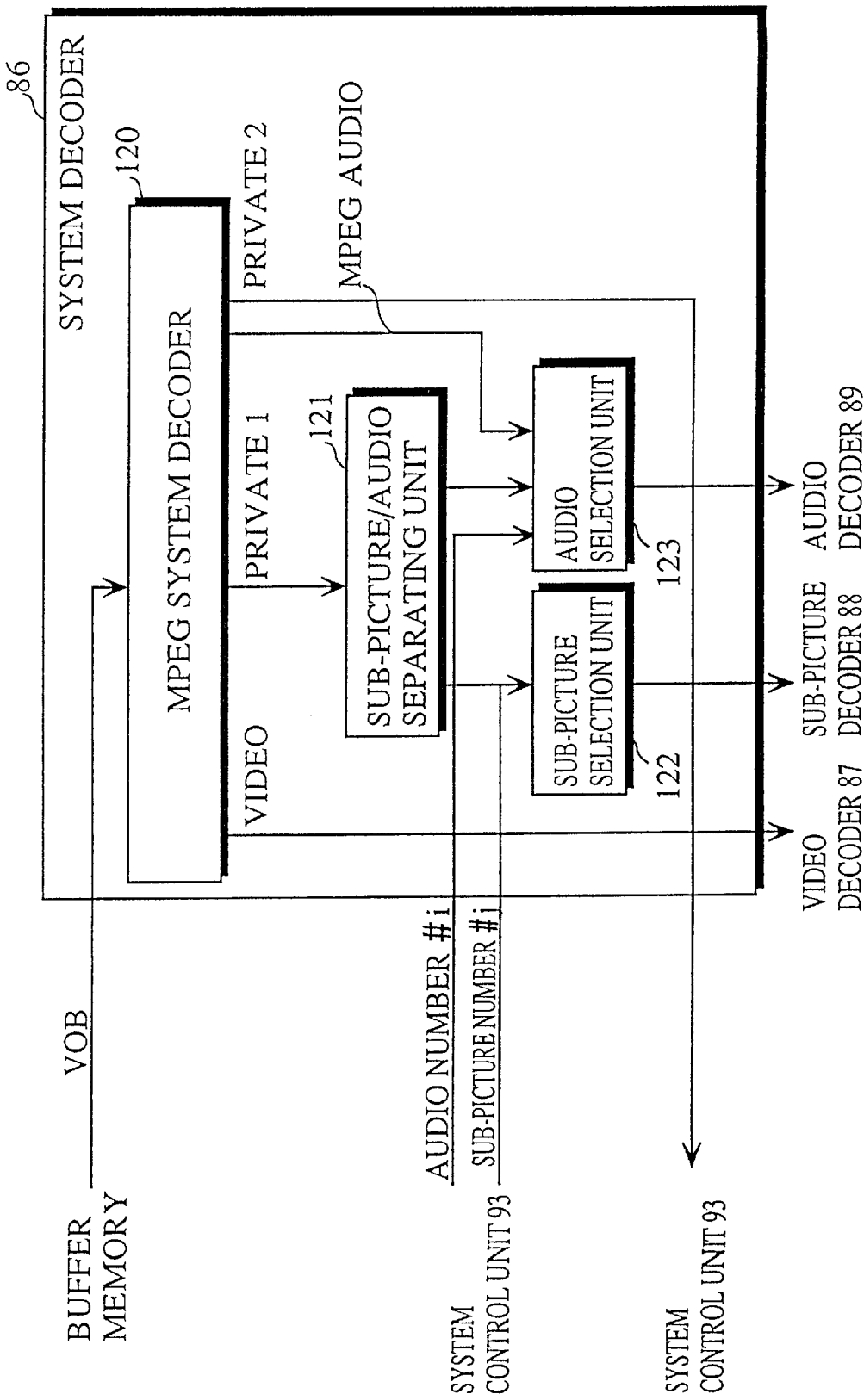
FIG. 14A shows a block diagram for the construction of the system decoder in the present embodiment.

FIG. 14A shows a block diagram for the construction of the system decoder 86 shown in FIG. 12B. As shown in this drawing, the system decoder 86 is made up of an MPEG decoder 120, a sub-picture/audio separator 121, sub-picture selection unit 122 and an audio selection unit 123.

The MPEG decoder 120 determines the kind of pack by referring to the stream ID in the pack header of each data pack included in the VOB transferred from the buffer memory and, depending on its determination result, outputs the packet data to the video decoder 87 for a video packet, to the sub-picture/audio separator 121 for private packet 1, to the system control unit 93 for private packet 2 and to the audio selection unit 123 for an MPEG audio packet.

The sub-picture/audio separator 121 determines the kind of packet by referring to the substream ID in the packet header of the private packet 2 inputted from the MPEG decoder 120 and, depending on its determination result, outputs the data to sub-picture selection unit 122 if it is sub-picture data or to the audio selection unit 123 if it is audio data. As a result, the audio data and sub-picture data of each number is outputted to the sub-picture selection unit 122 and to the audio selection unit 123.

The sub-picture selection unit 122 outputs to the sub-picture decoder 88 only the sub-picture data which has the number indicated by the system control unit 93, out of all the sub-picture data sent from the sub-picture/audio separator 121. The remaining sub-picture data is discarded.

The audio selection unit 123 outputs to the audio decoder 89 only the audio data which has the number indicated by the system control unit 93, out of the MPEG audio inputted from the MPEG decoder 120 and the audio data inputted from the sub-picture/audio separator 121. The remaining audio data is discarded.

Detailed Construction of the System Control Unit 93

Figure 14B:
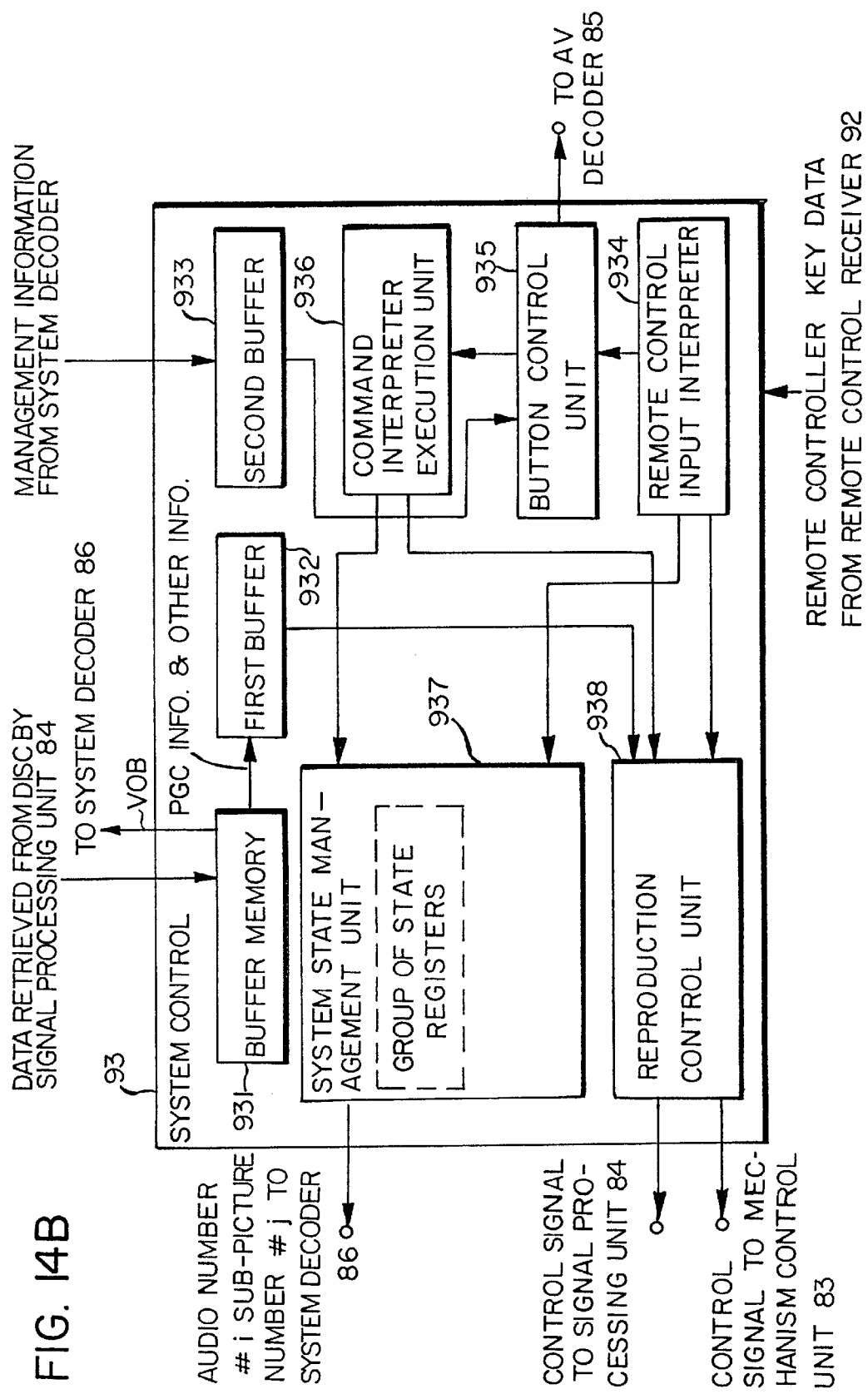
FIG. 14B shows a block diagram for the construction of the system control unit in the present embodiment.

FIG. 14B is a block diagram which shows a detailed example construction of the system control unit 93 in the present embodiment.

As shown in the drawing, the system control unit 93 is made up of a buffer memory 931, a first buffer 932, a second buffer 933, a remote control input interpreter 934, a button control unit 935, a command interpreter execution unit 936, a system state management unit 937 and a reproduction control unit 938.

The buffer memory 931 temporarily stores the data read from the optical disc by the signal processing unit 84 in logical block units and, under the control of reproduction control unit 938, outputs its content to the system decoder 86 when a VOB has been read, while when a non-VOB has been read, which is to say when the video manager management information or the video title set management information has been read, it outputs its content to the first buffer 932.

The first buffer 932 stores the video manager management information and the video title set management information. Here, it is possible for the first buffer 932 to have a storage capacity which is merely sufficient for storing a minimum of a one piece of PGC information.

The second buffer 933 stores the management information in the VOBU outputted from the system decoder 86. The content stored in the second buffer 933 is overwritten each time new management information in a next VOBU is outputted. Accordingly, a storage capacity of one or two kilobytes is sufficient. Here, the aforementioned buffer memory 931, first buffer 932 and first buffer 932 may be formed of different storage areas of a same memory, with FIG. 14B merely showing the buffers separated in terms of function.

The remote control input interpreter 934 receives an input of key data from the remote control reception unit 92 interprets which key has been depressed and informs the button control unit 935 of this type of key.

The button control unit 935 performs control to decide whether to execute a highlight command and whether to change a display color based on the management information stored in the second buffer 933 and on the button type notification from the remote control input interpreter 934. More specifically, when the button notification is that a cursor key or numeral key has been depressed, the button control unit 935 outputs an indication to the AV decoder unit 85 to change the color of the indicated selection item to the selection color based on the management information. This indication of display color is outputted in accordance with the color information shown in FIG. 10 and the item display information for each selection item. When the button notification is that the enter key has been depressed, the button control unit 935 outputs an indication to change the display of the item with the selection color to the confirmation color and, if a highlight command is set for that selection item, notifies the command interpreter execution unit 936 of the corresponding highlight command. When the button notification is that the menu key has been depressed, the button control unit 935 outputs an indication of a command to reproduce the volume menu to the command interpreter execution unit 936. Also, when the button notification is that the angle key has been depressed, the button control unit 935 outputs an indication of an angle change command to the command interpreter execution unit 936. The other buttons bear no direct relation to the present invention and so will not be described.

The command interpreter execution unit 936 receives highlight commands, volume menu reproduction commands, title menu reproduction commands and angle switching commands from the button control unit 935, interprets these command and then executes them. More specifically, on interpreting that a highlight command is "SETSTN #i, #j", the command interpreter execution unit 936 writes the audio number #i and the sub-picture number #i into the specified registers in the system state management unit 937. The values in these specified registers are then directly sent to the system decoder 86, so that an immediate switch to reproduction of this combination of audio number #i and sub-picture #j can be executed. Alternatively, on interpreting that a highlight command is "LINK PGC#n", the command interpreter execution unit 936 gives an indication to the reproduction control unit 938 to read PGC#n. Alternatively, on interpreting an angle switching command, the command interpreter execution unit 936 updates the angle number which is stored in a specific register and gives an indication to the reproduction control unit 938 to read a jump address for a different angle which is indicated by the updated angle number. A similar procedure is also executed when a SETSTN command includes an angle number.

The system state management unit 937 includes a group of registers which include the specified registers described above, and is used to store the internal condition of the reproduction device. As described above, these specified registers store the audio number #i and the sub-picture number #j, with their stored contents being directly outputted to the audio selection unit 123 and the sub-picture selection unit 122 in the system decoder 86, as well as storing the angle number as required during the reproduction of a multiangle block.

The reproduction control unit 938 controls the mechanism control unit 83 and the signal processing unit 84 in accordance with the video title set management information and the video manager management information stored in the first buffer 932 and, by doing so, controls the entire reading process of the multimedia optical disc. As one example, on receiving "LINK PGC#n" either as a post-processing command stored by the first buffer 932 or as an indication from the command interpreter execution unit 936, the reproduction control unit 938 controls the reading of the newly-indicated PGC#n. The reproduction control unit 938 also controls the reading of a series of VOBs in accordance with the route information stored by the first buffer 932. This control of the reading of a series of VOBs is performed as described below for the case when, as described in FIG. 7B, a VOB to be reproduced next belongs to a multiangle block (which is to say its block type is "angle"). First, if the block type of the VOB is angle and the block mode is "start", and an angle number is already stored in the specified register, the reproduction control unit 938 reads the VOB of this angle number. However, if an angle number is not already stored in the specified register (such as when the angle number is "0"), the reproduction control unit 938 reads the VOB whose block mode is "start". If the block mode is "middle" or "end", then since the reproduction of one VOB in the multiangle block is completed on such reproduction, the next VOB to be reproduced is found from the VOB information which follows the VOB information whose block mode is "end". Accordingly, for the example in FIG. 7B, reproduction is performed in the order of VOB#4–VOB#5–VOB#8.

Simplified Operation of the System Control Unit 93

Figure 15:
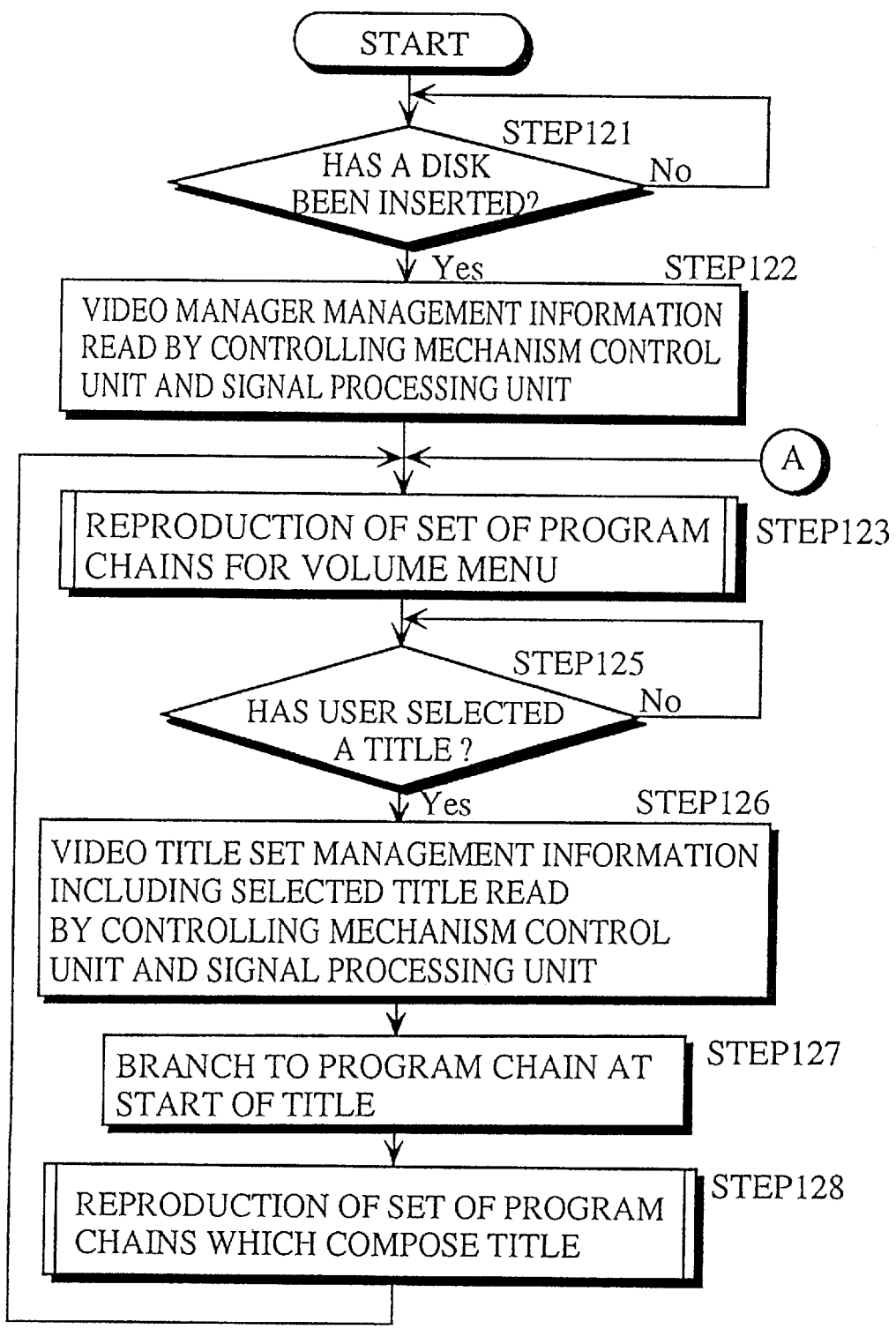
FIG. 15 shows a flowchart for the processing content of the system control unit in the present embodiment.

FIG. 15 shows a flowchart for the processing content of the system control unit 93 shown in FIG. 12B.

First, on detecting that a disc is set in the reproduction device, the system control unit 93 controls the mechanism control unit 83 and the signal processing unit 84 and has disc rotation control performed until stabilized retrieval from the disc can be performed, at which point the optical pickup is moved, the volume management region shown in FIG. 6 is read and, based on the information in the volume management region, the volume information file shown in FIG. 7 is read (steps 121, 122). Next, the system control unit 93 reproduces the program chain for the volume menu, based on the volume menu management information in the volume information file (step 123). During the reproduction of the program chain for the volume menu, the user can give an indication of the number of their desired audio data and sub-picture data. Here, the reproduction of the volume menu program chain at the start of reproduction of the optical disc may be unnecessary depending on the way in which the multimedia data is used, in which case such reproduction can be omitted.

Next, the system control unit 93 displays the program chain for the title menu in accordance with the set of titles management information in the volume information file (step 124) and, based on the user selection (step 125), reads the file management information for the video file which includes the selected title (step 126) and branches to the program chain at the start of the selected title (step 127). The system control unit 93 reproduces the set of program chains and returns to step 124 on completing the reproduction (step 128).

Reproduction Process of the System Control Unit

Figure 16:
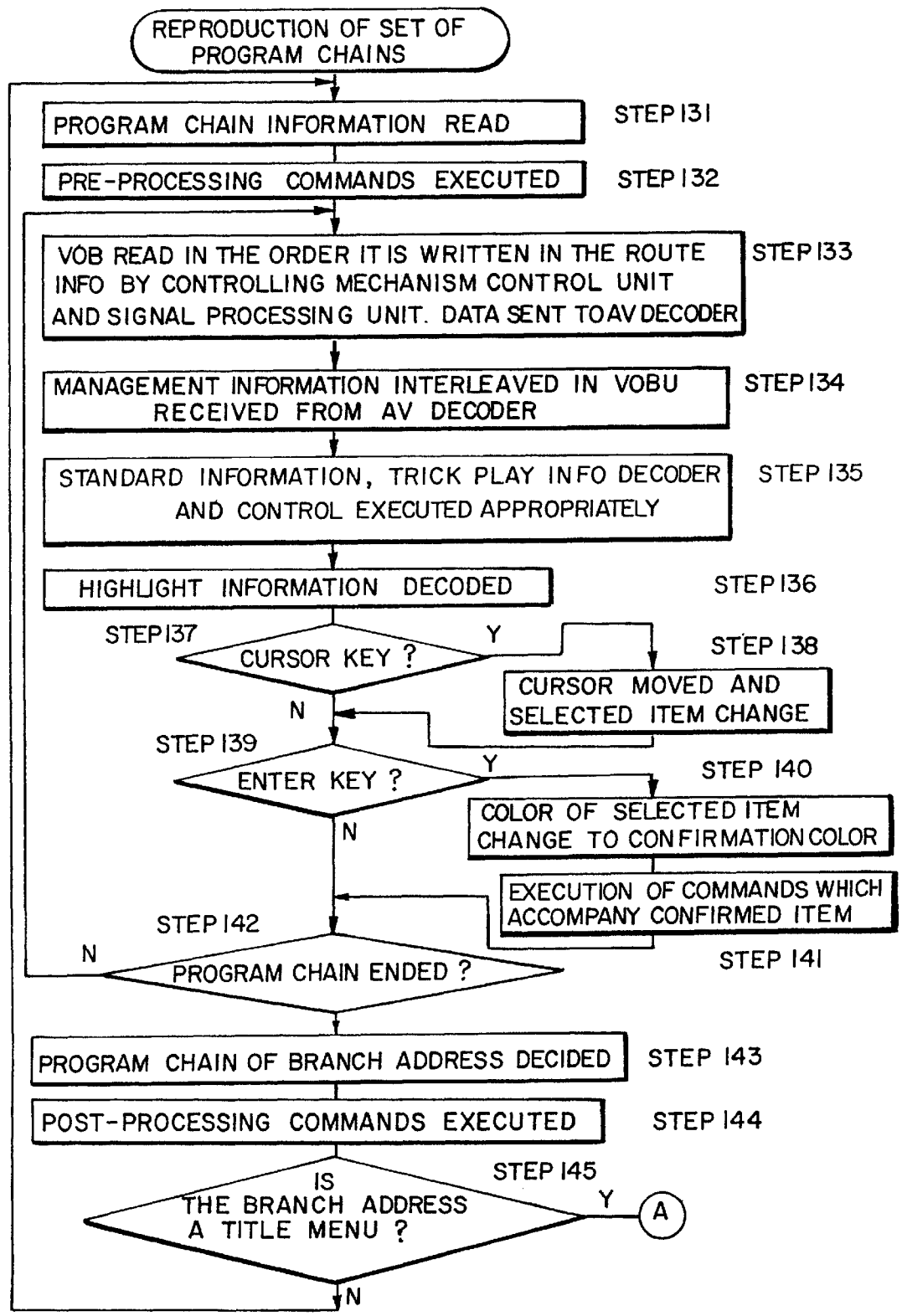
FIG. 16 shows a detailed flowchart for the reproduction process of a set of program chains by system control unit in the present embodiment.

FIG. 16 shows a detailed flowchart for the reproduction process of a set of program chains by system control unit 93. This process includes the same processing as steps 123, 124 and 128 in FIG. 15.

In FIG. 16, the system control unit 93 first reads the appropriate PGC information from the program information table in either the video manager or the video title set (step 131), and then executes the pre-processing command (step 132). If the command is a SETSTN command, the audio and sub-picture numbers #i and #j indicated in the command are reported to the audio selection unit 123 and the sub-selection unit 122 in the system decoder 86. Also, when an angle number is indicated in the SETSTN command, the specifies register is set using the initial setting of angle number.

Next, system control unit 93 controls the mechanism control unit 83 and the signal processing unit 84 and so reads the system streams in the order of the pointers written in the system stream information shown in FIGS. 7 and 9 (step 133). The retrieved system streams are separated and reproduced by the AV decoder unit 85. At this point, the separated video and sub-picture are displayed on the display screen (not illustrated), with audio output also being commenced using the audio data. After this, the system control unit 93 receives the management information separated by the AV decoder unit 85 (step 134), decodes the standard information and trick play information in the pack management information shown in FIG. 10 and executes control in accordance with the decoding result (step 135).

Furthermore, the system control unit 93 decodes the highlight information in the pack management information (step 136) and, when there has been a reception from the remote control reception unit 92 of key data corresponding to a cursor key or numeral key, changes the selected item on the display screen and its selection color (steps 137, 138), or when there has been a reception of key data corresponding to the "enter" key, changes the color of the selected item on the display screen to the confirmation color (steps 139, 140), as well as executing the command corresponding to the confirmed item (step 141). The processing of this command is the same as for the pre-processing command described above.

Next, the system control unit 93 returns to step 133 when there is a next VOB to be reproduced (step 142:no), while when there is no VOB to be reproduced (when the PGC has been completed) (step 142:yes), the system control unit 93 decides the PGC which is the branch address (step 142) and executes a post-processing command (step 143). The processing of this post-processing command is the same for the pre-processing command described above. Also, when the branch address is a title menu, the system control unit 93 returns to step 124 shown in FIG. 15 (step 144:no), while when this is not the case, the system control unit 93 returns to step 131 (step 144:yes).

Volume Menu Display Process of the System Control Unit 93

Figure 17:
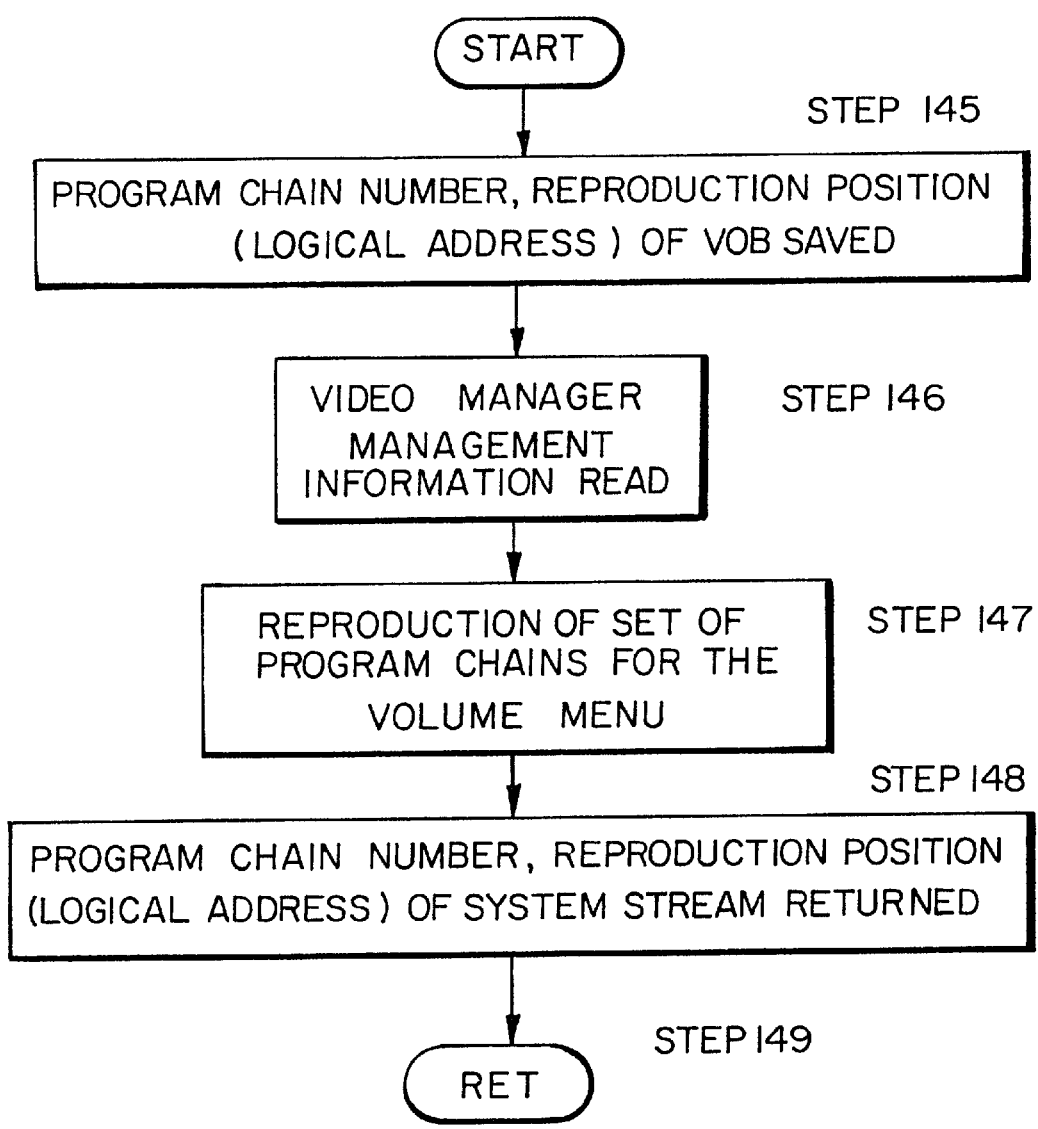
FIG. 17 shows a flowchart for the volume menu display reproduction process of the system control unit when the "menu" key on the remote controller is depressed in the present embodiment.

FIG. 17 is a flowchart for the volume menu display reproduction process performed by the system control unit 93 when the "menu" key is pressed on remote controller 91.

Here, system control unit 93 performs the process in this drawing when there is an interruption process due to the "menu" key being depressed. After the interruption has occurred, the system control unit 93 saves the PGC number being reproduced at that point and the logical block address which shows the present reproduction position of the VOB in the memory (step 145) and reads the volume manager (step 146). The retrieval of this volume manager may be performed by reading the optical disc in the same way as in step 122 in FIG. 15, or alternatively the information may be stored in the memory during the retrieval in step 122 so that it can be read from the memory in the present step.

After this, the system control unit 93 reproduces the set of PGCs for the volume menu based on the volume manager (step 147). This reproduction of the set of program chains is the same as the process in FIG. 16 so it will not be described in detail. By reproducing this volume menu, the user can select a combination of audio data and sub-picture image. As one example, if the command corresponding to the selected item is "SETSTN #2, #3", the system control unit 93 indicates the selected audio data #2 to the audio selection unit 123 and the selected sub-picture data #3 to the sub-picture selection unit 122.

After the reproduction of the volume menu PGC has been completed, the system control unit 93 has a return of the saved PGC number and the logical block address which shows the original reproduction position in the VOB (step 148) and leaves the interruption process (step 149). By doing so, reproduction can be recommended from the reproduction position in the VOB for the original PGC. However, at this point the reproduced sub-picture data and audio data switch to those indicated by the numbers which were set according to the user's wishes using the SETSTN command.

The following is an explanation of the operation of the reproduction device described above.

First, the following is a simplified explanation of the disc retrieval and reproduction operations for five basic operation examples which are explained below.

Figure 20:
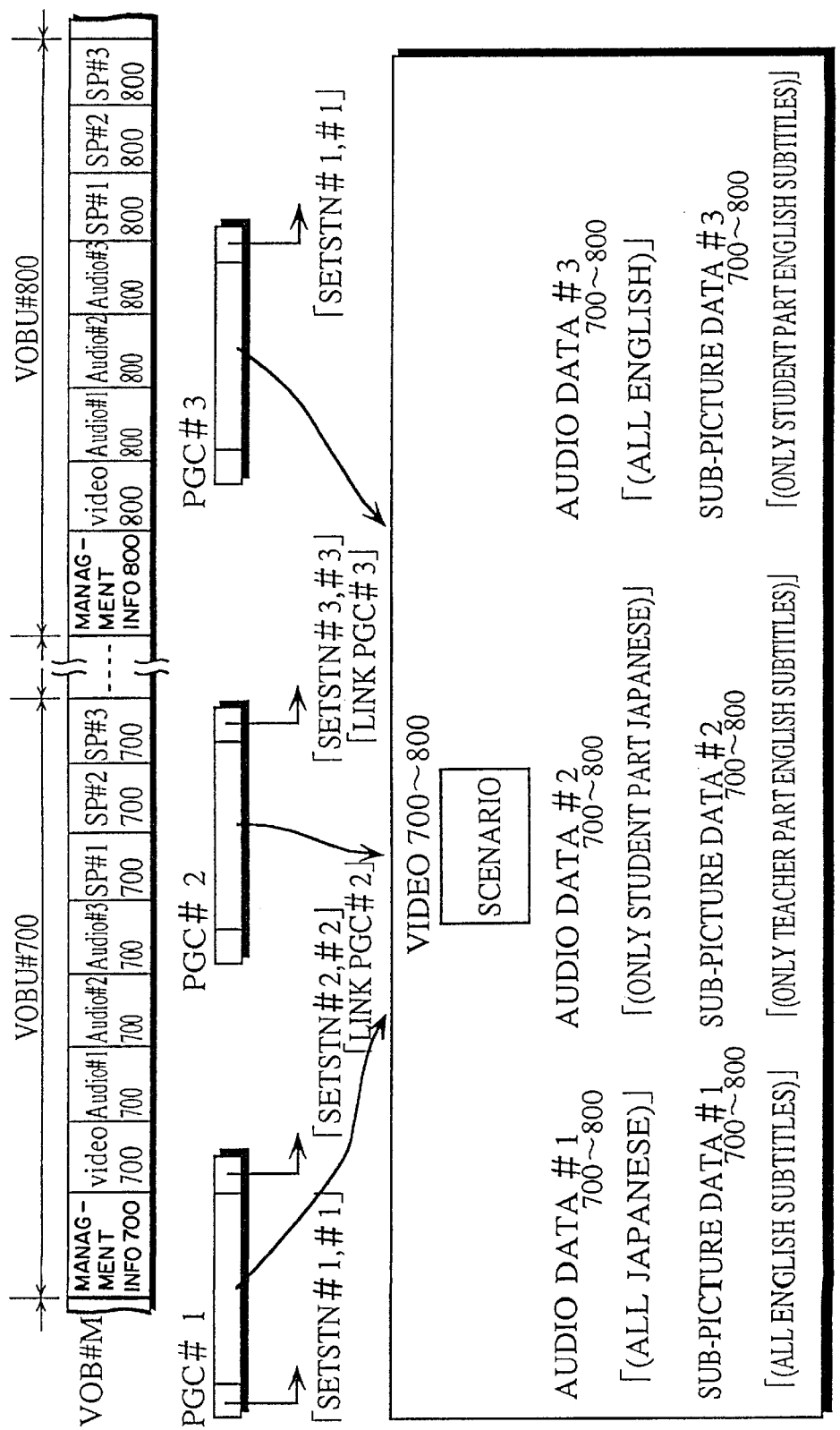
FIG. 20 shows a karaoke part selection video object included in the volume menu program chain in the present embodiment.

Once a disc has been set in the reproduction device, disc rotation control is performed until stabilized retrieval can be achieved, at which point the optical pickup is moved and the volume management region shown in FIG. 6 is read. This volume management region stores the file information for the inside of the file block, with the volume information file shown in FIG. 7 being read based on this information. For this example operation, it is supposed that a karaoke disc is to be reproduced. The volume menu for this disc is a title selection menu for karaoke (the titles in this case being songs). Here, if a song is a duet, the title menu can be a part selection menu for the duet as shown in FIG. 20.

As shown in FIG. 9, the title search pointer management information stored at the start of the video file which includes this title is read at the start of reproduction of this title. Here, for the case when the title is a duet song, this title search pointer management information stores PGC numbers corresponding to the title menu for selecting a part to be reproduced out of the plurality of parts stored in the video title set. The PGCs for the title are read and reproduction control is performed in accordance with the PGC information shown in FIG. 9.

Figure 18:
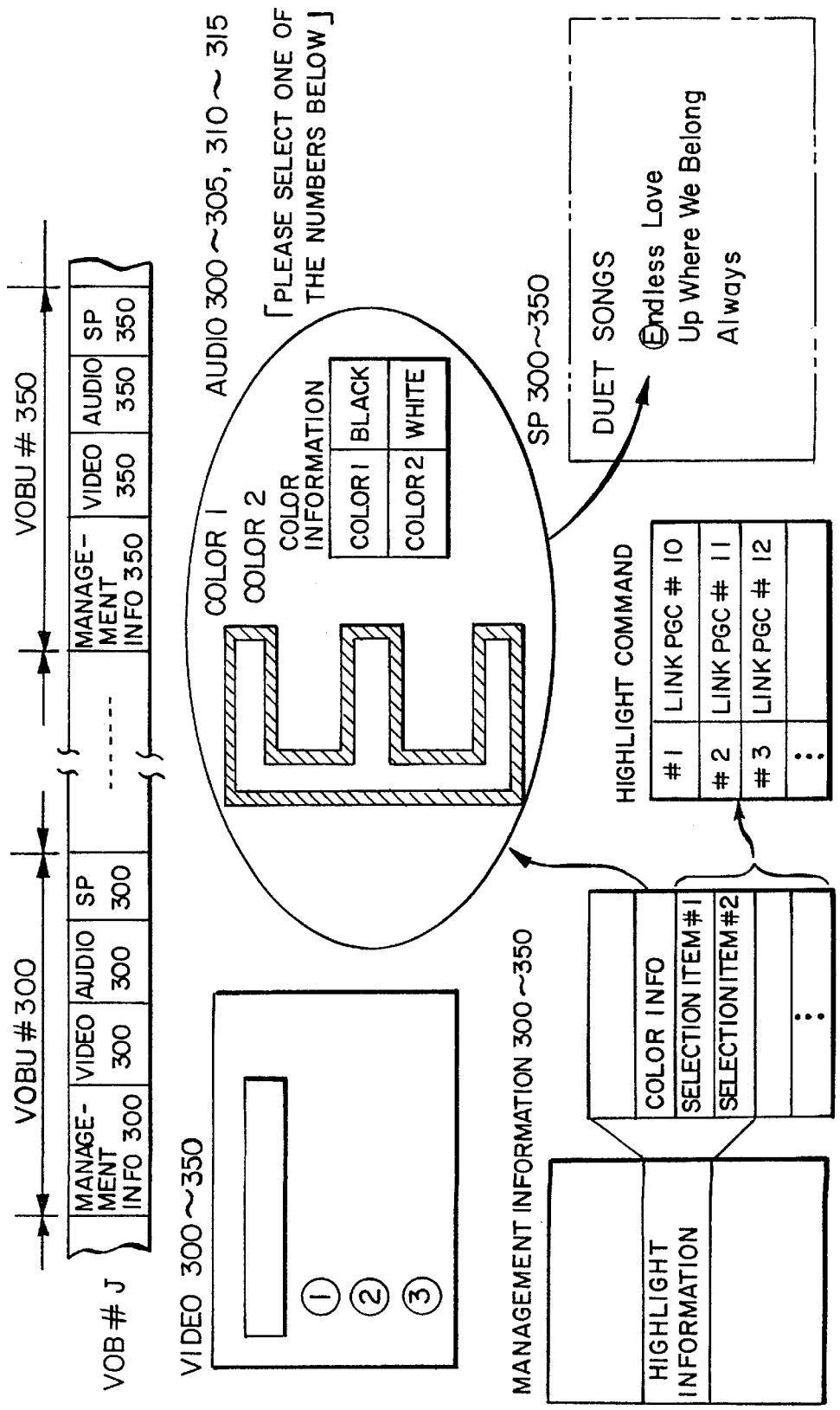
FIG. 18 shows an example of a program chain in the present embodiment.

An example of a volume menu program chain to be reproduced here is shown in FIG. 18. The PGC in this drawing is for menu selection of duet karaoke title, with this PGC being made up of one VOB#J. The video 300–350 in this VOB displays a background image for the menu using an MPEG still image, while the sub-picture (SP in the drawing) data 300–350 expresses color information for a two-color character for a selection item which is to be overwritten onto the background image, changing the backgrounds color in accordance with the color information in the highlight information of the management information 300–350. The audio data 300–305 and 310–315 is for aural guidance to help the user make a selection. Note that here, LINK commands are stored corresponding to selection items in the highlight information in the pack management information. Here, the video data and sub-picture data are outputted by the reproduction device having first been combined.

If, after viewing the menu and hearing the aural guidance, the user makes a selection by pressing button "2" on the remote controller 91, the information for this operation of remote controller 91 is sent from the remote control reception unit 92 to system control unit 93. The process corresponding to this button selection "2" is interpreted as the command "LINK #PGC#11" corresponding to button "2" in the highlight information in the control data of the system stream, with reproduction control advancing to program chain #n. The reproduction of program chain #n is then commenced as described above.

Figure 19:
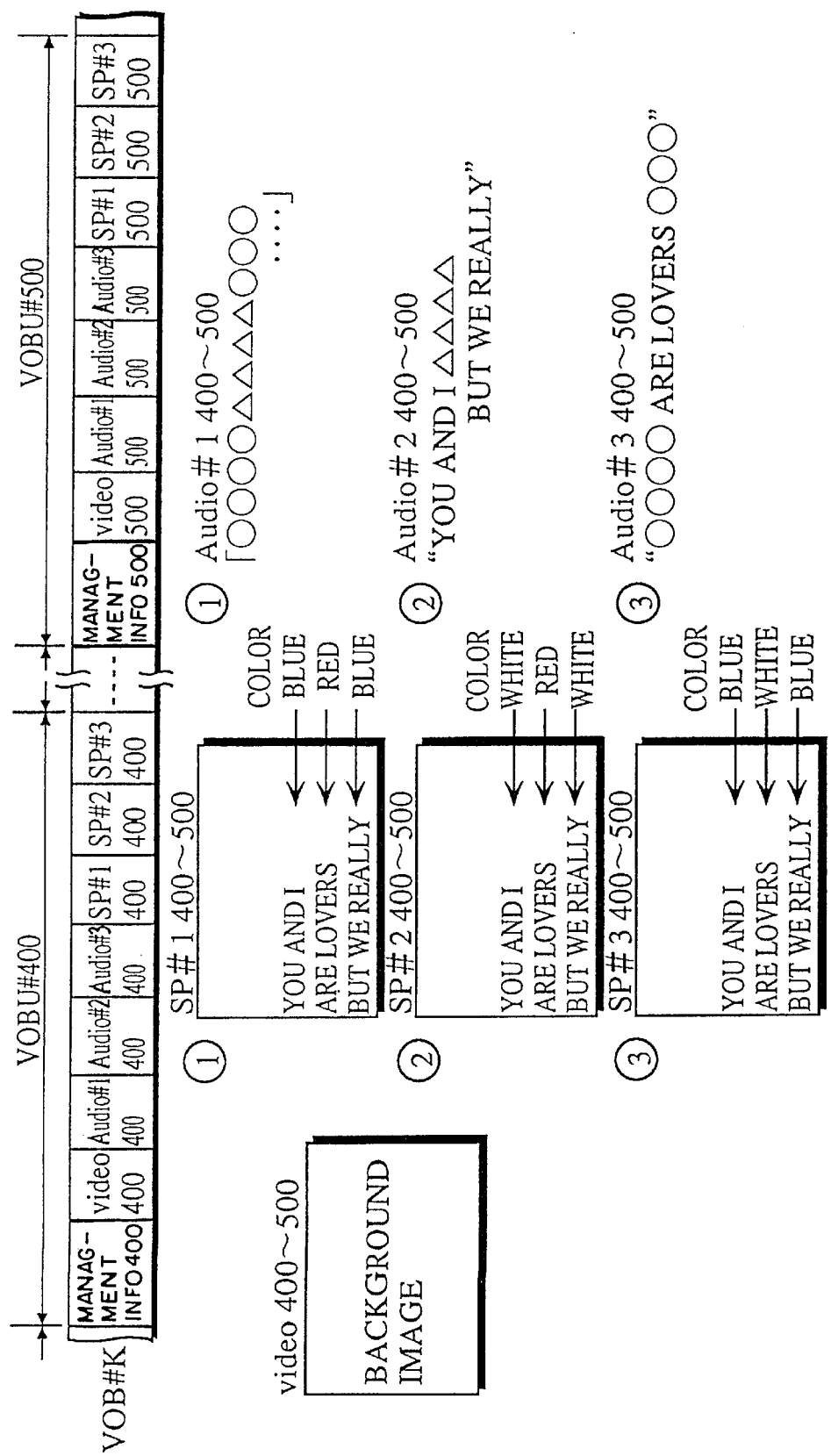
FIG. 19 shows an example of a karaoke reproduction video object in the present embodiment.

The following is an explanation of the operation when the following examples of data are written on the disc:

(1) karaoke songs (2) an English conversion lesson (3) a quiz (4) a golf game (5) a baseball broadcast (1) Operation for a Disc Containing Karaoke Songs FIG. 19 shows an example of a karaoke reproduction VOB (set as VOB#K) for explaining the present example operation. In this VOB#K, one set of video 400–500 for a background image is interleaved with three different kinds of audio data #1–#3 and three different kinds of sub-picture data #1–#3. In the sub-picture data, the male part is displayed using blue text and the female part using red text, with the lyrics for any vocal part already included in the audio data being displayed using white text. In reality, the display colors change in time with the reproduction of the song, although here, for ease of explanation, the colors in the present operation do not change as the song is reproduced. In the audio data, the symbols oΔ denote that only the accompaniment for male or female part is included in the audio data.

The following is an explanation of the reproduction process and operation of a karaoke disc which includes the VOB#K described above.

First, when a disc is set in the reproduction device and reproduction is begun, the volume manager shown in FIG. 6 is read and transmitted to the system control unit 93 which then sets a common reproduction mode for the entire volume based on the volume menu management information. More specifically, the volume menu PGC specified by the volume menu management information is reproduced. This volume menu is reproduced by the title selection menu such as that explained above and shown in FIG. 18. Also, when a duet title has been selected in the title selection menu, the title menu for part selection in the duet is reproduced.

FIG. 20 shows the content of the karaoke part selection VOB (set as VOB#L) included in the part selection title menu PGC in the present example. It is composed in the same way as the volume menu (VOB#K) for title selection shown in FIG. 18, although there are differences in the content of the management information. In the management information of the VOB#L, the command "SETSTN #i, #j" is stored in the highlight information shown in FIG. 10. Here, the selection items #1–#3 correspond to the buttons "1"–"3" on the remote controller 91. By doing so, when the female part is selected by pressing the "2" key on the remote controller 91, the reproduction control command "SETSTN #3, #3" is executed so that an indication to switch the audio data and sub-picture data is sent to the system decoder 86. After this indication has been executed, the appropriate audio and sub-picture are outputted before the reproduction of the song shown in FIG. 19 is commenced.

It should be noted here that in order to avoid undesirable results due to commands being executed immediately, it is also possible for the system control unit 93 to wait for an appropriate length of time. Also, since the execution of commands is not limited to the reproduction period of disc menus, setting may be performed during any of the PGCs, making the setting operation flexible enough for users' needs.

The above example operation describes the commencing of reproduction of a karaoke song after a combination of audio data and sub-picture data have been selected during the reproduction of the volume menu, although it is still possible for the user to change the combination of audio data and sub-picture data during reproduction of the karaoke song. In this case, all of the management information in the VOB#K for karaoke reproduction shown in FIG. 19, may include the same highlight information as the highlight information shown in FIG. 10. This storing of the same highlight information is because the menu VOB#L and the karaoke VOB#K have the same data construction. By doing so, during the reproduction of the karaoke song, a SETSTN command corresponding to the pressing of one of the buttons "1"–"3" on the remote controller 91 is executed. By doing so, a switch to the desired audio data and sub-picture data can be performed without halting the karaoke reproduction.

By means of this example operation, the optical disc and reproduction device of the present embodiment can allow a user to easily select his/her desired audio data and sub-picture data without needing to know beforehand the numbers of the audio data and the sub-picture data. It is also possible for the user to easily change the audio data and sub-picture data once reproduction has begun.

Furthermore, it is also possible in the above example of karaoke for separate VOB for different background video images to be provided as a multiangle block. In such a case, by using SETSTN commands the user can enjoy a variety of combinations of video data, audio data and sub-picture data.

(2) Operation for a Disc Containing an English Conversion Lesson

While the first example operation deals with the issuance of commands according to menus, the present operation example will describe an example when reproduction mode is automatically switched as reproduction proceeds, so that, for one VOB, different combinations of audio data and sub-picture data are successively displayed.

Figure 21:
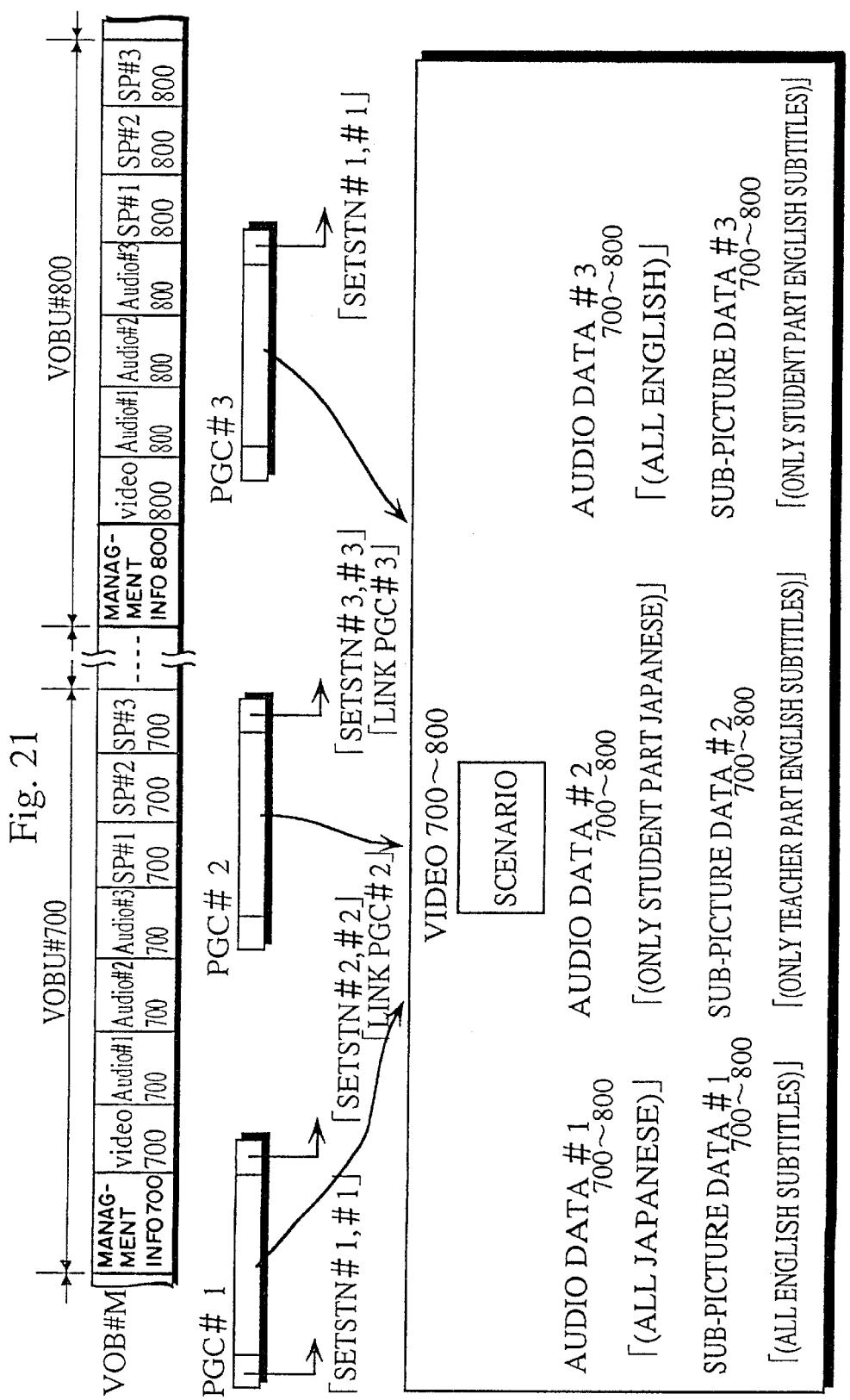
FIG. 21 shows the operation which, by means of pre-processing commands and post-processing commands, makes effective use of video data in the video objects.

Normally, English conversation teaching videos show the same example conversations a number of times, with the content of the audio and subtitles changing as the lesson progresses. Here, as described in the prior art section relating to conventional video CDs, it has been necessary to record all of the different patterns as separate VOBs on a disc, with the multiple recording of video data which requires a large amount of data posing a serious problem. The present example operation is for a case where a conversation scenario to be repeatedly reproduced can be stored in just one stream using post-processing commands of a caller PGC. Here, FIG. 21 shows an example where reproduction using the same VOB (the VOB#M) is to be performed three times using different combinations of audio data and sub-picture data. In this figure, three PGCs (PGC#1–PGC#3) are indicated in the same set of route information of VOB#M. As shown in FIG. 9, PGCs can include pre-processing and post-processing commands. First, for the reproduction of program chain 1, the pre-processing command "SETSTN #1, #1" is executed so that audio 1 and sub-picture 1 are reproduced along with the main video image. Once the reproduction of program chain 1 is complete, the post-processing commands of program chain #1, "SETSTN #2, #2" and "LINK PGC#2", are executed and the process advances to the reproduction of program chain #2. Based on the settings, the reproduction of program chain 2 is composed of the reproduction of audio 2 and sub-picture 2 along with the main video image, once this is complete, the post-processing commands of program chain #2, "SETSTN #3, #3" and "LINK PGC#3", are executed and the process advances to the reproduction of program chain #3. Once the reproduction of program chain #3 is complete, the post-processing command "SETSTN #1, #1" is executed so that the original (default) settings of audio 1 and sub-picture 1 are restored.

By providing PGCs with pre- and post-processing commands which give indications but at the same time still only use the one VOB#M as described above, a variety of different reproduction combinations can be achieved automatically. In the present example, only three program chains were used, but since the amount of data needed to store a program chain is negligible when compared to the size of a system stream, an improvement can be made in the storage efficiency of a disc medium in addition to the improved effectiveness of reproduction which uses one VOB.

(3) Operation for a Disc Containing a Quiz

For a quiz, it is common to set different levels of hints even for the same question. In a system stream for realizing this, the video data which provides hints is interleaved with a variety of pieces of audio data which are aural explanations to help the user solve the quiz and a number of pieces of sub-picture data which differ in the area and degree to which they mask the video data which provides the hints. By doing so, the content of the audio data which gives an aural explanation to help the user solve the quiz and the size and area of the sub-picture image which masks the video image will change according to the level set by a user using an interactive menu.

As can be seen in this example operation, this arrangement enables the realization of new kinds of multimedia software such as game-like quizzes which are based around video clips and therefore require expanded use of DVDs.

(4) Operation for a Disc Containing a Golf Game

The following is an explanation of an example operation which effectively generates sub-picture data when the sub-picture data includes graphics data and a program for processing the graphics data. This example golf game includes a function for displaying the putting line when putting on the green.

For the system stream used in this example, the video data is for a moving picture image which shows the undulating green from different angles. The sub-picture data includes a three-dimensional representation of the green, data showing pin position, a program calculating and displaying putting line and viewpoint position data corresponding to the video data. The former three are registered at the start of a VOB and are set in the graphics processing unit in the sub-picture decoder 88 at the start of reproduction. The remaining viewpoint position data which corresponds to the video data is data which shows the changes in the viewpoint position as the moving picture data changes the viewing angle of the green, with the viewpoint position data being stored in the VOB so as to correspond to the video data.

The aforementioned putting line program includes a function which moves a ball mark display in accordance with user manipulations of the cursor keys, so that when a ball mark display is positioned at an arbitrary putting position and the enter key is depressed, the three-dimensional display of the green is shown with the line as far as the hole being displayed in accordance with the undulations of the green shown by the three-dimensional representation.

By means of the above operation, a user who wishes to know the correct putting line can view the correct line from a ball mark display position to the hole just by positioning the ball mark position at an arbitrary putting position. Here, an image which gives a feeling of being on the spot and of three-dimensionality which was unavailable for conventional TV images can be achieved.

(5) Operation for a Disc Containing a Baseball Broadcast

The following is an explanation of an example of VOBs in a multiangle block in which the audio data and sub-picture data can be dynamically changed in accordance with a switching of angle.

The multiangle block is made up of three VOBs #1–#3 which include video data for a baseball broadcast shot at the following three angles; (1) behind the backstop, (2) first base, and (3) third base. In such a case, VOB#1 is made up of video data 1 showing the action viewed from behind the backstop and audio data #1—1 which is a standard commentary. VOB#2 is made up of video data 2 showing the action viewed from the first base stands, audio data #2-1 which is the standard commentary and audio data #2—2 which is a commentary from the first base stands. VOB#3 is made up of video data 3 showing the action viewed from the third base stands, audio data #3-1 which is the standard commentary and audio data #3-2 which is a commentary from the third base stands. Here, the standard commentary in audio data #1—1, audio data #2-1 and audio data #3-1 is the same. Audio data #2—2 and audio data #3-2 are separate soundtracks which correspond to the alternative angles.

When viewing the aforementioned multiangle period, the user can select their desired commentary when switching to an alternative angle.

As examples, when the backstop angle is selected, the standard commentary is reproduced. When the first base angle is selected, the standard commentary or the separate first base commentary can be selected using the master menu. The same is true for the third base angle.

Also, by adding the respective commands "SETSTN #1, #0", "SETSTN #2, #0" and "SETSTN #3, #0" to the management information for VOB#1–#3 and performing automatic confirmation as the reproduction progresses, automatic switching of audio data and angle can be achieved. In this case, too, it is still possible for the user to select the standard commentary by means of menu selection.

For this kind of multiangle data, whenever there is a switching of angles, it is possible to also switch audio data/sub-picture data, which enhances the viewer's feeling of being on the spot.

The following is a simplified explanation of the construction of an optical disc in the embodiment of the present invention.

FIG. 22 shows a flowchart for the manufacturing process of the optical disc in the present embodiment.

First, the data in the volume region shown in FIG. 6 is generated by a logical data stream generation device (step 191). This logical data stream generation device uses multimedia data editing software on a personal computer or workstation and can generate volume data of the data construction shown in FIG. 6. This volume data is recorded onto a transfer medium, such as magnetic tape, and is then converted into a physical data stream by a physical data stream generation device (step 192). This physical data stream includes an ECC (error checking code), data for the lead-in region, data for the lead-out region and the like, in addition to the volume data. A master disc cutting process then cuts a master disc for the optical discs using this physical data stream (step 193). Finally, optical discs are manufactured from the master disc by a pressing device.

The aforementioned manufacturing process can be achieved, with the exception of the part about the logical data stream generation device using the data construction of the present invention, by the same manufacturing equipment as conventional CDs. This is described in "Compact Disc Reader" by Heitaro Nakajima and Hiroshi Ogawa, Ohm Books and in "Optical Disc Systems" by the Applied Physics Society/Optics Discussion Group, Asakura Publishing.

It should be noted here that in the first operation example (karaoke) the SETSTN command which indicates the combination of audio data and sub-picture data was executed during the reproduction of a title menu for part selection which precedes the commencement of reproduction of a song, although the present invention should not be construed as being limited to such timing. As a different example, when the volume menu is called by the "menu" key on the remote controller 91, a setting button may be provided for the above combination to allow changes to the combination.

It should be noted here that in the present embodiment, the sub-picture data has been described as being made up of image data such as subtitles, although it is equally possible for such sub-picture data to be made up of vector graphics or three-dimensional computer graphics (CG). If such images are used, video games can be realized using a combination of compressed moving pictures for actual video footage and computer graphics.

The present invention is not just a video disc which can be used as a digital video disc (DVD) and instead can also be used as a multimedia disc, and while the number of audio tracks and sub-pictures for movie subtitles or for karaoke song lyrics may be limited to between a few and several dozen for a video disc, the present disc can still operate effectively even if between several hundred and several thousand audio tracks and sub-pictures are interleaved.

Also, the audio data is not limited to compressed audio and may instead be made up of non-compressed PCM data and computer audio, such as MIDI data.

The present embodiment describes the case when control data interleaved in VOBs is interleaved in each GOP which is used as the unit of compression. Here, VOBs on the DVD have variable bit rates, but since a pointer for the previous or succeeding GOP is necessary to perform trick plays such as rewind and fast forward, such pointers also end up being used as control data packets for trick play. However, the unit for the interleaving of the control data packet is not limited to a GOP.

Also, the present embodiment describes a read-only DVD although the effects of the present invention are no different if a rewritable disc is used.

Furthermore, the conception of menu used here is any means for finding a user selection and so should not be construed as being limited to a selection given using the numeral keys on the remote controller 91 used in the embodiment. As other examples, indications inputted using a mouse or voice inputs are equally possible. Also, VOBs in the present invention are based on MPEG standard, although should this standard be expanded, or should a differ standard emerge in the future, such a new standard may also be used provided that a plurality of pieces of data are interleaved and reproduced in a time series.

The present embodiment was also explained using the case where only one set of compressed video data is interleaved, although there need not be any limit on the number of sets of such video data.

Finally, the commands included in the management information may be automatically executed during the execution of reproduction for that part of the title, regardless of whether there has been a user indication. By doing so, reproduction control can be performed for a finer time division.

It should finally be noted that although the present embodiment describes the case when a DVD is used as the storage medium, the present invention is not limited to such a medium so that any storage medium capable of storing sets of video data, audio data and sub-picture data which can be selectively reproduced may be used. Also, should the reproduction device be able to receive multimedia data from an external source, the transfer of such multimedia data need not be restricted to having a storage medium as its source, so that the reproduction device may alternatively receive broadcasts of digital data. In such a case, the reproduction device shown in FIG. 12B would include a receiver for such digital broadcasts in place of the motor 81, optical pickup 82, mechanism control unit 83 and signal processing unit 84.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. An optical disc comprising:

a data region for storing a plurality of video objects, at least one of the video objects including a video stream, a plurality of audio streams, a plurality of sub-picture streams and control information, the control information indicating at least two sets, each set indicating one of the plurality of video objects, audio streams, and sub-picture streams from the plurality of audio streams and sub-picture streams in one of the plurality of video objects, which are selectively reproducible simultaneously with the video stream.

2. A reproduction apparatus for an optical disc having a data region for storing a plurality of video objects, at least one of the video objects including a video stream, a plurality of audio streams, a plurality of sub-picture streams and control information, the control information indicating at least two sets, each set indicating one of the plurality of video objects, audio streams, and sub-picture streams from the plurality of audio streams and sub-picture stream from the plurality of audio streams and sub-picture streams in one of the plurality of video objects, which are selectively reproducible simultaneously with the video stream, the apparatus comprising:

reading means for reading a video object from the optical disc;

a reproducing means for reproducing a video streams from the video object read from the optical disc; and a controller for controlling the reading means and the reproducing means, wherein the controller extracts the control information from the video object, selects one of the sets of video object, audio stream and sub-picture stream indicated by the extracted control information, controls the reading means to read the video object of the selected one of the sets from the optical disc, and controls the reproducing means to reproduce a video stream of the video object of the selected one of the sets and reproduce audio and sub-picture streams of the selected one of the sets.

3. A reproduction method for an optical disc having a data region for storing a plurality of video objects, at least one of the video objects including a video stream, a plurality of audio streams, a plurality of sub-picture streams and control information, the control information indicating at least two sets, each set indicating one of the plurality of video objects, audio streams, and sub-picture streams from the plurality of audio streams and sub-picture streams in one of the plurality of video objects, which are selectively reproducible simultaneously with the video stream, the method comprising the steps of:

reading a video object from an optical disc;

extracting the control information from the video object and storing the extracted control information in a memory of a reproduction apparatus;

selecting one of the combinations of video object, audio stream and sub-picture stream indicated by the control information; and simultaneously reproducing the video stream of the video object of the selected one of the combinations and audio and sub-picture streams of the selected one of the sets.

4. A reproduction method for reproducing digital data from a source, wherein the digital data is made of a plurality of video objects which include a video stream, a plurality of audio streams, a plurality of sub-picture streams and control information, the control information indicating at least two pairs of audio stream and sub-picture stream from the plurality of audio streams and sub-picture streams, which are selectively reproducible simultaneously with the video stream, the method comprising the steps of:

reading a video object from the source;

extracting the control information from the video object and storing the extracted control information in a memory of a reproduction apparatus;

selecting one of the pairs of audio stream and sub-picture stream indicated by the control information; and simultaneously reproducing the video stream and the audio stream and the sub-picture stream of the selected one of the pairs.

5. A storage medium comprising:

data region for storing a plurality of video objects, at least one of the video objects including a video stream, a plurality of audio streams, a plurality of sub-picture streams and control information, the control information indicating at least two sets, each set indicating one of the plurality of video objects, audio streams, and sub-picture streams from the plurality of audio streams and sub-picture streams in one of the plurality of video objects, which are selectively reproducible simultaneously with the video stream.

* * * * *

UNITED STATES PATENT AND TRADEMARK OFFICE
CERTIFICATE OF CORRECTION

PATENT NO. : 5,999,696
DATED : December 7, 1999
INVENTOR(S) : Kazuhiro Tsuga et al.

It is certified that error appears in the above-identified patent and that said Letters Patent are hereby corrected as shown below: *

Col. 27, line 47, before " audio" insert --an--;
line 47, after "audio" delete "streams" and insert --stream--;
line 48, before "sub-picture" insert --a--;
line 48, after "sub-picture" delete "streams" and insert --stream--;
line 58, before "audio" insert --an--;
line 58, after "audio" delete "streams" and insert --stream--;
lines 58-59 delete "and sub-picture streams from the plurality of audio streams";
line 58, before "sub-picture" insert --a--;
line 66, after "video" delete "streams" and insert --stream--;

Col. 28, line 20, before "audio" insert --an--;
line 20, after "audio" delete "streams" and insert --stream--;
line 20, after "sub-picture" delete "streams" and insert --stream--;
line 20, before "sub-picture" insert --a--;
line 61, before "audio" insert --an--;
line 61, after "audio" delete "streams" and insert --stream--;
line 62, before "sub-picture" insert --a--;
line 62, after "sub-picutre" delete "streams" and insert --stream--.

* Line numbers refer to numbers positioned between Col. 27 and Col. 28

Signed and Sealed this

Twenty-fourth Day of April, 2001

Attest:

NICHOLAS P. GODICI

Attesting Officer

Acting Director of the United States Patent and Trademark Office